United States Patent
Lee et al.

(10) Patent No.: US 7,165,416 B2
(45) Date of Patent: Jan. 23, 2007

(54) AIR CONDITIONER

(75) Inventors: Won Hee Lee, Seoul (KR); Yoon Jei Hwang, Seoul (KR); Chan Ho Song, Gwacheon-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/168,466

(22) Filed: Jun. 29, 2005

(65) Prior Publication Data

US 2005/0235677 A1    Oct. 27, 2005

Related U.S. Application Data

(62) Division of application No. 10/649,802, filed on Aug. 28, 2003, now Pat. No. 7,003,976.

(30) Foreign Application Priority Data

| Dec. 10, 2002 | (KR) | ............... | 10-2002-0078413 |
| Dec. 18, 2002 | (KR) | ............... | 10-2002-0081318 |
| Dec. 18, 2002 | (KR) | ............... | 10-2002-0081319 |
| Dec. 18, 2002 | (KR) | ............... | 10-2002-0081328 |

(51) Int. Cl.
  *F25D 17/04* (2006.01)
  *F25D 21/14* (2006.01)
  *F25D 19/00* (2006.01)

(52) U.S. Cl. ............... 62/406; 62/285; 62/298

(58) Field of Classification Search ............... 62/288, 62/285, 427, 298, 291, 150, 406, 412, 259.1
See application file for complete search history.

(56) References Cited

U.S. PATENT DOCUMENTS 2,751,760 A    6/1956   Williams, Jr.

3,866,867 A    2/1975   LaRocca (Continued)

FOREIGN PATENT DOCUMENTS

EP    867319 A2 *   9/1998

(Continued)

OTHER PUBLICATIONS

English Language Abstract of KR 2000-0006848.

(Continued)

*Primary Examiner*—Chen Wen Jiang
(74) *Attorney, Agent, or Firm*—Greenblum & Bernstein, P.L.C.

(57) ABSTRACT

Air conditioner including a case having air inlet and outlet passages therein perpendicular to each other, and a plurality of air inlet and outlets at ends of the air inlet and outlet passages, a regenerative heat exchanger at a cross point of the air inlet and outlet passages for making indirect heat exchange of the external air and room air flowing through the air inlet and outlet passages, a compressor, a flow path control valve for shifting, and guiding a flow path of refrigerant from the compressor proper to respective operation modes, first and second heat exchangers, an expansion device, a first fan in the air inlet passage for blowing external air into a room through the first heat exchanger, and a second fan in the air outlet passage for blowing the room air to an exterior through the second heat exchanger, thereby ventilating as well as heating or cooling the room at the same time.

20 Claims, 15 Drawing Sheets

U.S. PATENT DOCUMENTS

| | | | |
|---|---|---|---|
| 3,894,580 A | | 7/1975 | Charlet |
| 4,377,400 A | | 3/1983 | Okamoto et al. |
| 4,582,129 A | * | 4/1986 | Yano et al. .................. 96/118 |
| 5,197,538 A | | 3/1993 | Nagasaka et al. |
| 5,237,831 A | | 8/1993 | Sikora |
| 5,582,026 A | | 12/1996 | Barto, Sr. |
| 5,664,430 A | | 9/1997 | Karman |
| 5,697,227 A | * | 12/1997 | Bruce et al. .................. 62/285 |
| 5,732,565 A | | 3/1998 | Ramakrishnan et al. |
| 6,006,430 A | | 12/1999 | Fukuoka et al. |
| 6,199,394 B1 | | 3/2001 | Maeda |
| 6,612,365 B1 | * | 9/2003 | Saishu et al. .................. 165/54 |

FOREIGN PATENT DOCUMENTS

| | | | |
|---|---|---|---|
| JP | 51-143343 | | 11/1976 |
| JP | 52-88444 | | 7/1977 |
| JP | 53-32560 | | 3/1978 |
| JP | 54-172554 | | 12/1979 |
| JP | 60256735 A | * | 12/1985 |
| JP | 1-291030 | | 11/1989 |
| JP | 04327734 A | * | 11/1992 |
| JP | 07293932 A | * | 11/1995 |
| JP | 07293933 A | * | 11/1995 |
| JP | 2001-227769 | | 8/2001 |
| KR | 2000 0006848 | | 4/2000 |

OTHER PUBLICATIONS

English Language Abstract of JP 2001-227769.
English Language Abstract of JP 53-32560.
U.S. Appl. No. 11/168,465 to Lee et al., filed Jun. 29, 2005.
U.S. Appl. No. 11/168,299 to Lee et al., filed Jun. 29, 2005.
English Language Abstract of JP 1-291030.

* cited by examiner

AIR CONDITIONER

This is a divisional application of U.S. application Ser. No. 10/649,802, filed on Aug. 28, 2003 now U.S. Pat. No. 7,003,976, the contents of which is expressly incorporated by reference herein in its entirety.

This application claims the benefit of the Korean Application Nos. P2002-0078413 filed on Dec. 10, 2002, P2002-0081318, P2002-0081319, and P2002-0081328, three of which were filed on Dec. 18, 2002, which are hereby incorporated by reference.

BACKGROUND OF THE INVENTION

1. Field of the Invention

The present invention relates to air conditioners, and more particularly, to an air conditioner which can ventilate at the same time with cooling or heating of the room.

2. Background of the Related Art

FIG. 1 illustrates a related art air conditioning system which can cool or heat a room. As shown, the related art air conditioning system is provided with a compressor 1, a flow path control valve 2, an outdoor heat exchanger 3, an expansion device 5, and an indoor heat exchanger 4. There are an outdoor fan 3a adjacent to the outdoor heat exchanger 3, and an indoor fan 4a adjacent to the indoor heat exchanger 4. In the related art air conditioning system, the room having the indoor heat exchanger 4 provided thereto is cooled or heated under the control of the flow path control valve 2 which controls a flow path of gas refrigerant from the compressor 1. A process for cooling or heating the room with the air conditioning system will be discussed.

A process for cooling the room with the air conditioning system is as follows. In cooling operation, the flow path control valve 2 guides gas refrigerant from the compressor 1 to the outdoor heat exchanger 3. The gas refrigerant heat exchanges with air blow by the outdoor fan 3a, and is condensed into liquid refrigerant at the outdoor heat exchanger 3. In this instance, the outdoor heat exchanger 3 serves as a condenser, and discharges heat to an environment. The liquid refrigerant condensed at the outdoor heat exchanger 3 is provided to, and expanded at the expansion device 5 into a low temperature, and low pressure refrigerant, and vaporizes at the indoor heat exchanger 4. In this instance, as the vaporizing refrigerant absorbs vaporizing heat from an environment of the indoor heat exchanger 4, air around the indoor heat exchanger 4 is cooled. The cooled air is blown by indoor fan 4a into the room, to cool the room. The refrigerant vaporized at the indoor heat exchanger 4 is introduced into the compressor 1 again. The air conditioner repeats the foregoing process to cool the room continuously.

Next, a process for heating the room with the air conditioning system is as follows. In heating operation, the flow path control valve 2 guides gas refrigerant from the compressor 1 to the indoor heat exchanger 4. The gas refrigerant introduced into the indoor heat exchanger 4 heat exchanges with room air blow by the indoor fan 4a, and is condensed into liquid refrigerant. In this instance, the indoor heat exchanger 4 serves as a condenser 4, and discharges heat to an environment. The heat discharged from the indoor heat exchanger 4 is discharged into the room by the indoor fan 4a, to heat the room. The liquid refrigerant from the indoor heat exchanger 4 is expanded into low temperature, and low pressure refrigerant at the expansion device 5, and introduced into the outdoor heat exchanger 3. The refrigerant vaporizes, and absorbs heat from an environment, at the outdoor heat exchanger 3. Therefore, the outdoor heat exchanger 3 serves as an evaporator. The refrigerant vaporized at the outdoor heat exchanger 3 is introduced into the compressor 1 again, to repeat the foregoing process, for keep heating the room. Thus, the related art air conditioning system cools or heats the room by absorbing vaporizing heat from, or discharging condensing into, the room. However, the related art air conditioning system has a problem in that the room air is contaminated and dried when a certain time period is passed after the air conditioning system is started because the air conditioning system cools or heats the room air, and circulates through the room, repeatedly.

In the meantime, when users feel unpleasant as the room air becomes contaminated or dried, the user opens a window to ventilate the room. In this instance, since the room air having a substantial temperature from the external air is discharged to an exterior, resulting in a large energy loss. The cooling or heating of the room required until the room temperature reaches to a certain temperature after the ventilation increases power consumption, substantially.

SUMMARY OF THE INVENTION

Accordingly, the present invention is directed to an air conditioner that substantially obviates one or more of the problems due to limitations and disadvantages of the related art.

An object of the present invention is to provide an air conditioning system and an air conditioner, which can ventilate at the same time with cooling or heating of a room, and prevent waste of thermal energy in the ventilation.

Another object of the present invention is to provide an air conditioner having a structure which enables easy discharge of condensed water formed at a heat exchanger of the air conditioner.

Further object of the present invention is to provide an air conditioner having a structure which enables an easy mounting of components to the air conditioner.

Still further object of the present invention is to provide an air conditioner having a structure which can prevent damage to a heat exchanger during transportation and mounting of the heat exchanger in the air conditioner.

Additional features and advantages of the invention will be set forth in the description which follows, and in part will be apparent to those having ordinary skill in the art upon examination of the following or may be learned from practice of the invention. The objectives and other advantages of the invention will be realized and attained by the structure particularly pointed out in the written description and claims hereof as well as the appended drawings.

To achieve these objects and other advantages and in accordance with the purpose of the present invention, as embodied and broadly described herein, the air conditioning system includes a compressor, a flow path control valve for shifting, and guiding a flow path of refrigerant from the compressor proper to respective operation modes, first and second heat exchangers connected to respective outlets of the flow path control valve for condensing or vaporizing the refrigerant, an expansion device on a refrigerant pipeline connected between the first and second heat exchangers, for expanding refrigerant either from the first or second heat exchanger, a first fan for blowing external air into a room through the first heat exchanger, a second fan for blowing room air to an exterior through the second heat exchanger, and a regenerative heat exchanger for making indirect heat exchange of the external air and room air respectively blown by the first and second fans.

The regenerative heat exchanger includes first flow passages spaced a predetermined distance away from each other for flow of the room air, second flow passages in contact with, and between adjacent first flow passages for flow of the external air.

The regenerative heat exchanger is mounted at a point the external air and the room air cross each other, and includes a plurality of plates spaced a distance away from each other for alternate flow of the external air and the room air through each layer, and a flow guide plate between adjacent plates in parallel to a flow direction of the external air or the room air, each having a cross section of a plurality of continuous folds. The fold includes an upward slope extending from a left lower point to a middle peak point, and a downward slope extending from the middle peak point to a right lower point. Preferably, the external air and the room air flow substantially perpendicular to each other.

In another aspect of the present invention, there is provided an air conditioner including a case having air inlet and outlet passages therein perpendicular to each other, and a plurality of air inlet and outlets at ends of the air inlet and outlet passages, a regenerative heat exchanger at a cross point of the air inlet and outlet passages for making indirect heat exchange of the external air and room air flowing through the air inlet and outlet passages, a compressor in the case, a flow path control valve for shifting, and guiding a flow path of refrigerant from the compressor proper to respective operation modes, first and second heat exchangers connected to respective outlets of the flow path control valve and provided to the air inlet and discharge passages for condensing or vaporizing the refrigerant guided by the flow path control valve, an expansion device on a refrigerant pipeline connected between the first and second heat exchangers, for expanding refrigerant either from the first or second heat exchanger, a first fan in the air inlet passage for blowing external air into a room through the first heat exchanger, and a second fan in the air outlet passage for blowing the room air to an exterior through the second heat exchanger.

The air inlet passages and the air outlet passages are provided by ducts mounted in a crossed form in the case.

The air inlets include a first air inlet for making the air outlet passage and the room be in communication, and first air outlet for making the air inlet passage and the exterior be in communication, and the air outlets include a first air outlet for making the air inlet passage and the room be in communication and a second air outlet for making the air outlet passage and the exterior be in communication. The first air inlet and the first air outlet are formed in two faces of outside faces of the case formed to face different directions.

The case further includes a plurality of louvers rotatably mounted to the first air outlet for adjusting a discharge direction of air.

The regenerative heat exchanger includes first flow passages spaced a predetermined distance away from each other for flow of the room air, second flow passages in contact with, and between adjacent first flow passages for flow of the external air. The external air and the room air flow substantially perpendicular to each other in the regenerative heat exchanger.

The regenerative heat exchanger includes a plurality of plates spaced a distance away from each other for alternate flow of the external air and the room air through each layer, and a flow guide plate between adjacent plates in parallel to a flow direction of the external air or the room air, each having a cross section of a plurality of continuous folds. The fold includes an upward slope extending from a left lower point to a middle peak point, and a downward slope extending from the middle peak point to a right lower point.

The first heat exchanger is provided between the regenerative heat exchanger and the first air outlet, and the second heat exchanger is provided between the regenerative heat exchanger and the second air outlet. The second heat exchanger is mounted adjacent to the regenerative heat exchanger, and the first heat exchanger is mounted adjacent to the first air outlet.

The first fan is mounted between the regenerative heat exchanger and the first heat exchanger, and the second fan is mounted between the first air inlet and the regenerative heat exchanger. The compressor is mounted adjacent to the second air outlet in the air outlet passage.

The case further includes condensed water receiving grooves in parts of a bottom thereof under lower parts of the first and second heat exchangers respectively, a drain channel connected to the condensed water receiving grooves, and a drain provided in the bottom of the drain channel. The condensed water receiving grooves have sloped bottoms for leading the condensed water toward the drain channel. The drain channel connects one or opposite ends of each of the condensed water receiving grooves. The drain channel has a sloped bottom for leading the condensed water toward the drain. The drain is provided to a side adjacent to an outdoor.

The air inlet further includes a third air inlet for making the air inlet passage and the room be in communication. The third air inlet is provided between the regenerative heat exchanger and the first air outlet. The third air inlet is provided in the bottom of the case. The air conditioner further includes a flow passage opening/closing device in the case for selective opening/closing of the third air inlet and the air inlet passage. The flow passage opening/closing device includes opening/closing panel hinge coupled to a bottom of the case between the regenerative heat exchanger and the third air inlet, a driving device mounted in the case, and a linkage connected between the driving device and the opening/closing panel for selective opening/closing of the third air inlet and the air inlet passage with the opening/closing panel following operation of the driving device. The driving device is a reversible motor.

In the meantime, the compressor, the first and second evaporators, the first and second fans, and the regenerative heat exchangers are slid into/out of the case through sides of the case in mounting/dismounting the compressor, the first and second evaporators, the first and second fans, and the regenerative heat exchangers. The refrigerant pipelines connected between the compressor, the first and second heat exchangers and wirings are arranged adjacent to a first side of the case. The compressor and the first and second heat exchangers are mounted/dismounting through the first side, and the first and second fans are mounted/dismounted through a second side opposite to the first side.

The duct further includes first sliding guides provided at corners where the air inlet passage and the air outlet passage cross for guiding mounting/dismounting of the regenerative heat exchanger.

The air conditioner further includes a base plate for fixing the compressor thereon, and a second sliding guide in a bottom part of the case where the air outlet passage is for receiving the base plate in mounting/dismounting the base plate through the side. The sliding guide is provided in the bottom of the case where the air outlet passage is.

The air conditioner further includes third sliding guides provided between the regenerative heat exchanger and the second air outlet for mounting/dismounting the second heat exchanger through a side of the case, and fourth sliding guides provided between the regenerative heat exchanger and the first air outlet for mounting/dismounting the first heat exchanger through a side of the case. The condensed water receiving guide is formed in a bottom part of the case under a space between the third and fourth sliding guides.

The air conditioner further includes fifth sliding guides between the regenerative heat exchanger and the first air inlet for mounting/dismounting the second fan through the side of the case, and sixth sliding guides between the regenerative heat exchanger and the first air outlet for mounding/dismounting the first fan through the side of the case. The first or second fan includes an orifice at a center for passing air, a body to be inserted in the fifth or sixth sliding guides, a motor having a rotation shaft positioned at the orifice, and a blade assembly rotatably connected to the rotation shaft.

In the meantime, the first or second heat exchanger further includes a jig for covering an outside circumference of the fins. The jig includes a frame having one opened side, for covering other sides of the first or second heat exchangers. The jig includes one pair of jig bodies to be folded for covering a circumference of the first or second heat exchanger from opposite sides, and a hinge for coupling the one pair of jig bodies. The hinge is provided at a side opposite to the opened side. The jig body is fastened to the heat exchanger with a fastening member. The fastening member is provided at an end of the jig body adjacent to the opened side.

In the meantime, the jig body includes at least one drain hole provided in a bottom side for draining down the condensed water from the first or second heat exchanger. The case further includes a condensed water receiving groove for storing the condensed water from the drain hole. The jig further includes a condensed water container under the bottom side thereof for storing the condensed water from the drain hole.

It is to be understood that both the foregoing description and the following detailed description of the present invention are exemplary and explanatory and are intended to provide further explanation of the invention claimed.

BRIEF DESCRITPION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

Figure 1:
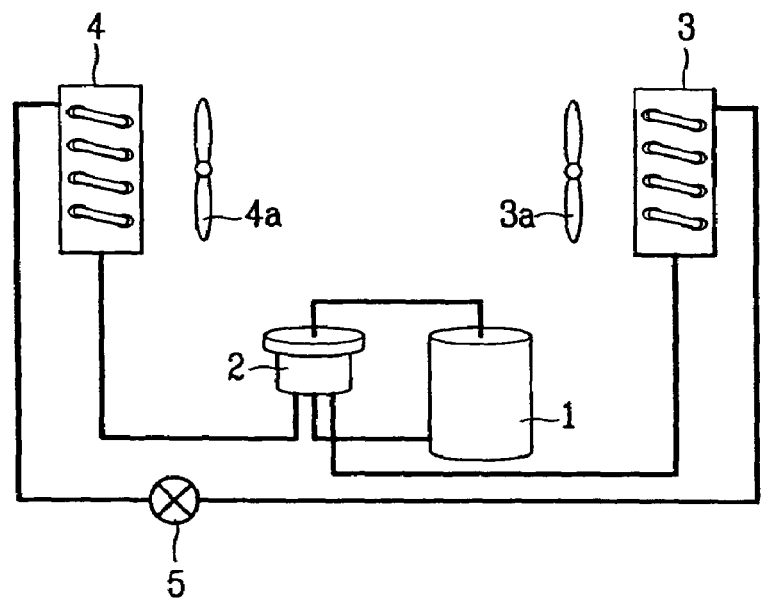
FIG. 1 illustrates a related art air conditioning system which can cool or heat a room, schematically.
Figure 2:
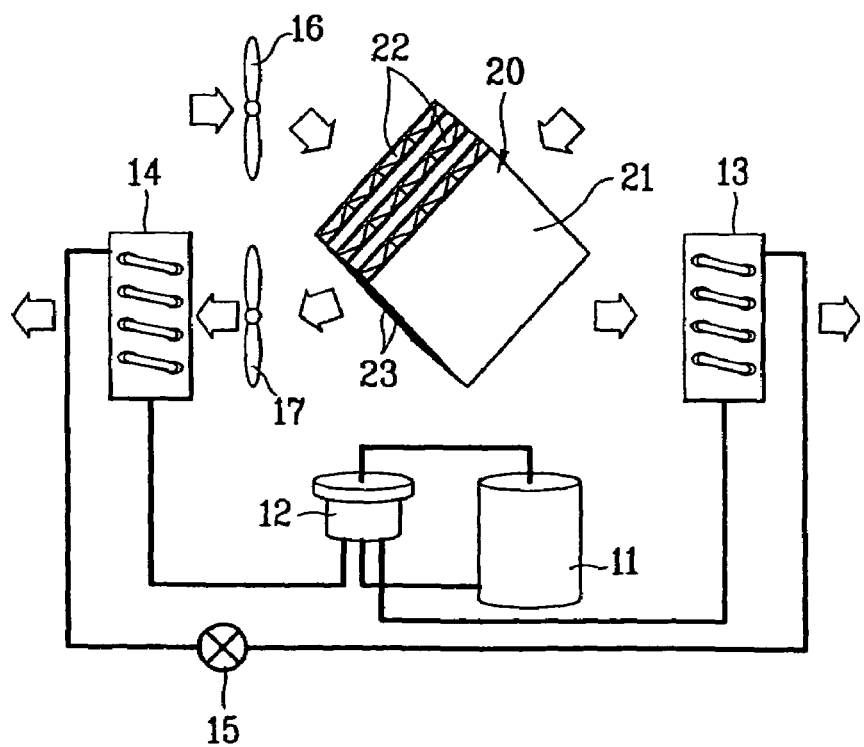
FIG. 2 illustrates an air conditioning system in accordance with a preferred embodiment of the present invention, schematically.
Figure 3:
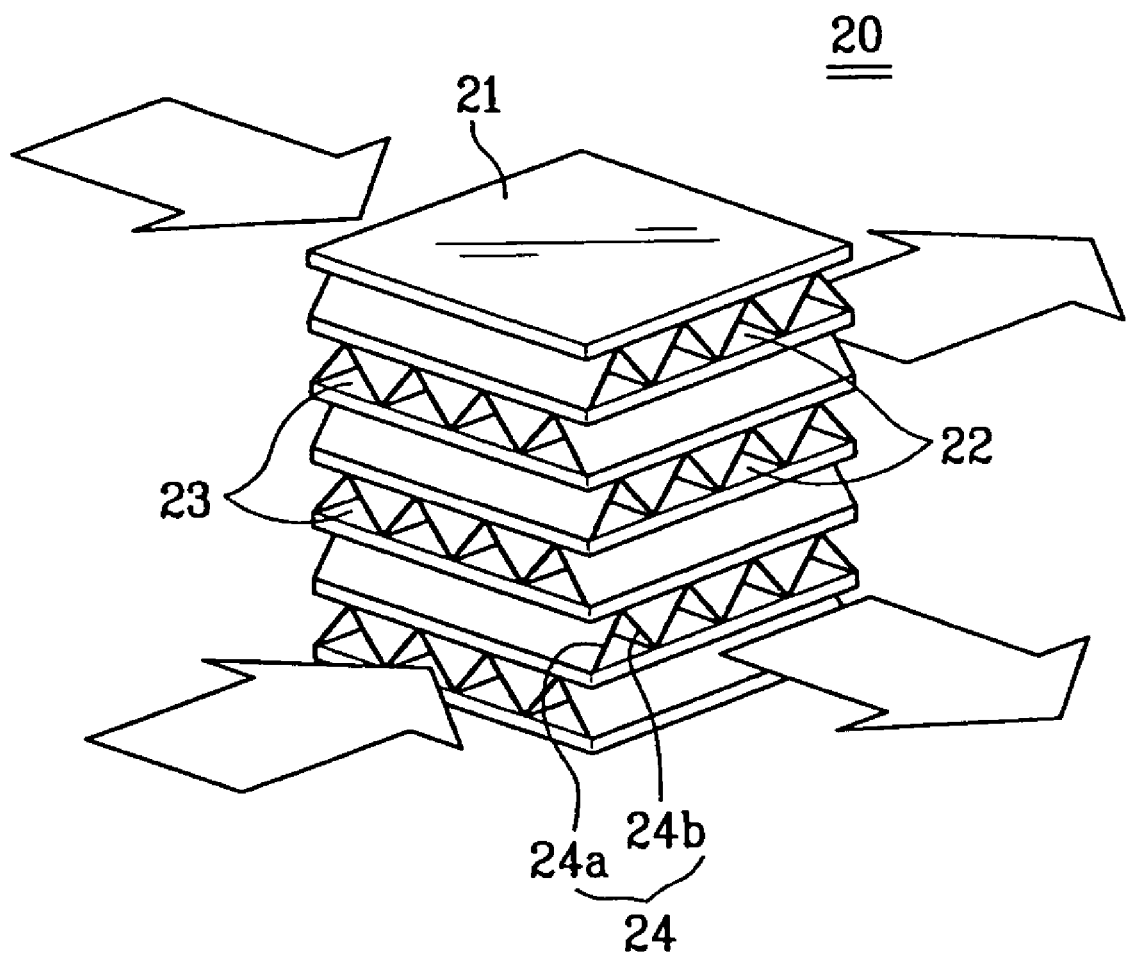
FIG. 3 illustrates a perspective view of a part of a regenerative heat exchanger in the air conditioning system in FIG. 2.

Reference will now be made in detail to the preferred embodiments of the present invention, examples of which are illustrated in the accompanying drawings. In describing the embodiments, same parts will be given the same names and reference symbols, and repetitive description of which will be omitted. FIG. 2 illustrates an air conditioning system in accordance with a preferred embodiment of the present invention schematically, and FIG. 3 illustrates a perspective view of a part of a regenerative heat exchanger in the air conditioning system in FIG. 2.

Referring to FIG. 2, there is a flow path control valve 12 connected to an outlet of a compressor 11. The flow path control valve 12 has two outlets connected to a first heat exchanger 14 and a second heat exchanger 13, respectively. The first, and second heat exchangers 14 and 13 are connected with refrigerant pipelines having an expansion device 15 mounted thereon. There is a first fan 17 for circulating room air through the first heat exchanger 14. There is second fan 16 for discharging the room air to exterior through the second heat exchanger 13. The first and second fans 17 and 16 are not limited to axial flow fans, but a variety of fans can be employed as the fans.

In the meantime, there is a regenerative heat exchanger 20 mounted at a point where the external air and the room air respectively blown by the first fan 17 and the second fan 16 cross. The regenerative heat exchanger 20 makes the external air and the room air respectively blown by the first fan 17 and the second fan 16 heat exchange indirectly, for supplying the heat carried on the air discharged to the exterior to the external air supplied into the room.

The regenerative heat exchanger 20 has a plurality of first flow passages 22 for the room air, and a plurality of second flow passages 23 for the external air. The first flow passages 22 are spaced from each other, and the second flow passages 23 are arranged between the first flow passages 22 such that the second flow passages 23 are in contact with the first flow passages 22, respectively. In more detail, the first flow passages 22 and the second flow passages 23 are provided between a plurality of plates 21 spaced a distance from each other, to form multiple layers. That is, the first flow passages 22 and the second flow passages 23 are provided alternately to the layers of the plates 21. The plates 21 are arranged parallel to air flow directions of the room air and external air.

In the meantime, there is a flow guide plate 24 between adjacent plates 21 for guiding a flow direction of the room air or the external air to keep a direction of flow of its own without changing the flow direction. As shown in FIG. 3, the flow guide plate 24 has a cross section of a plurality of continuous folds, each having an upward slope 24a and a downward slope 24b. The upward slope 24 extends from a left lower point to a middle peak point. The downward slope 24b extends from the middle peak point to a right lower point. The middle peak point is in contact with an underside of an upper plate, and the left or the right lower point is in contact with upper surface of a lower plate.

It is preferable that the room air and the external air flowing through the first flow passages 22 and the second flow passages 23 in the regenerative heat exchanger 20 and making heat exchange indirectly flow perpendicular to each other, substantially. To do this, as shown in FIG. 3, the flow guide plate in the first flow passage 22 and the flow guide plate in the second flow passage 23 are arranged perpendicular to each other. It is preferable that the plate 21 is formed of a material with good thermal conductivity, such as aluminum, or copper. Then, a heat exchange performance is improved during the room air and the external air pass through the first flow passages 22 and the second flow passages 23 respectively, thereby reducing an energy loss. In the meantime, a structure of the regenerative heat exchanger is not limited to the foregoing structure, but any structure is acceptable as far as the structure permits indirect heat exchange of the room air and the external air without mixed with the other in the regenerative heat exchanger.

The operation of the foregoing air conditioning system will be described. When the compressor 11 is put into operation, compressed gas refrigerant is introduced from the compressor 11 into the flow path control valve 12. The flow path control valve 12 introduces the refrigerant to the first heat exchanger 14 or the second heat exchanger 13 selectively proper to respective operation modes of the air conditioning system.

When the air conditioning system cools the room, the refrigerant is introduced into the second heat exchanger 13. The refrigerant heat exchanges with the room air blown by the second fan 16, and condensed into liquid refrigerant at the second heat exchanger 13. The refrigerant liquefied at the second heat exchanger 13 is expanded at the expansion device 15 and introduced into the first heat exchanger 14. The refrigerant vaporizes at the first heat exchanger 14, and absorbs heat from an environment. In this instance, since the first fan 17 draws air from an exterior, and discharges the air into the room via the first heat exchanger 14, the external air is discharged into the room after the external air heat exchanges, and is cooled at the first heat exchanger 14, the room is cooled.

During above process, the external air introduced into the room by the first fan 17 indirectly heat exchanges with the room air discharged to the exterior at the regenerative heat exchanger 20. That is, while the room air is discharged through the first flow passages 22 and the external air is introduced into the room through the second flow passages 23, the room air and the external air heat exchange to each other indirectly through the plate 21. In the meantime, in the regenerative heat exchanger 20, the flow guide plate 24, not only guides flow direction of the room air and the external air, but also enlarges a contact area with the room air and the external air, to improve a heat exchange performance. Thus, the regenerative heat exchanger 20 reduces thermal loss effectively as the thermal energy in the room air discharged to the exterior is supplied to the external air supplied to the room.

In the meantime, when the room is cooled, the refrigerant is introduced into the first heat exchanger 14 from the flow path control valve 12. The refrigerant heat exchanges with the external air introduced by the first fan 17, and condensed at the first heat exchanger 14. In this instance, since the first heat exchanger 14 discharges condensing heat to an environment, heated external air is introduced into the room. The refrigerant condensed at the first heat exchanger 14 is introduced into the compressor 11 again via the expansion device 15 and the second heat exchanger 13. In this instance too, since the thermal energy in the room air is transferred to the external air at the regenerative heat exchanger 20, an energy loss can be reduced.

Thus, the air conditioning system of the present invention introduces external air into a room in cooling or heating the room, and discharges room air to an exterior, the room can be ventilated at the same time with cooling or heating of the room. Moreover, the transfer of the thermal energy in the room air discharged to an exterior to the external air supplied to the room by using the regenerative heat exchanger 20 reduces a thermal energy loss taken place in ventilation can be reduced, significantly.

In the meantime, the present invention provides an air conditioner having the air conditioning system applied thereto. The air conditioner of the present invention will be described with reference to the attached drawings. For reference, FIG. 4 illustrates a perspective view showing an inside of an air conditioner in accordance with a preferred embodiment of the present invention.

Figure 4:
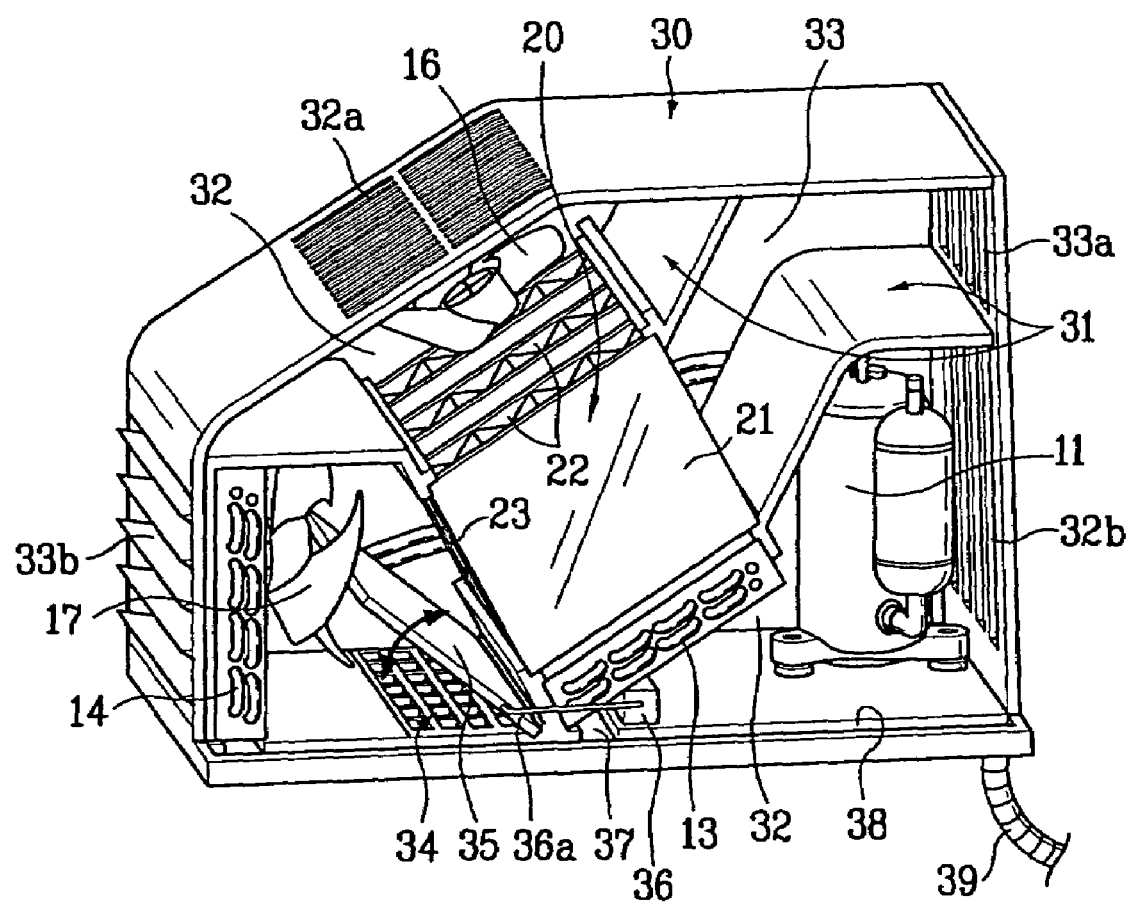
FIG. 4 illustrates a perspective view showing an inside of an air conditioner in accordance with a preferred embodiment of the present invention.

Referring to FIG. 4, there are an air inlet passage 33 and an air outlet passage 32 arranged to cross each other in a case 30. The air inlet and outlet passages 33 and 32 are fabrication of ducts 31. To do this, as shown in FIG. 4, the duct 31 has a form in which the two different flow passages, i.e., the air inlet passage 33 and the air outlet passage 32, are to cross each other. Ends of the air inlet passage 33 and the air outlet passage 32 of the duct 31 are extended to inside surfaces of sides of the case 30. There are a plurality of air inlets and a plurality of air outlets at the inside surfaces of the sides of the case 30 which make the ends of the air inlet passage 33 and the air outlet passage 32 be in communication with the room or the exterior.

A first air inlet 32a is provided to make the air outlet passage 32 and the room be in communication, and a second air inlet 33a is provided to make the air inlet passage 33 and the exterior be in communication. A first air outlet 33b is provided to make the air inlet passage 33 and the room be in communication, and the second air outlet 32 is provided to make the air outlet passage 32 and the exterior be in communication. The first air inlet 32a and the first air outlet 33b in the room are provided two different faces of the case 30 sloped to face different directions. For an example, as shown in FIG. 4, the first air outlet 33b is provided in a vertical face of the case 30 in the room, and the first air inlet 32a is provided in a sloped face extended from the vertical face with a slope in the room. When the first air inlet 32a and the first air outlet 33b are provided to face directions different from each other, the direct introduction of the external air discharged through the first air outlet 33b into the first air inlet 32*a* can be prevented effectively. In the meantime, the first air outlet 33*b* in the case 30 is provided with louvers for regulating a direction of air discharge.

There is a regenerative heat exchanger 20 in a part the air inlet passage 33 and the air outlet passage 32 cross. In the air conditioner of the present invention, detailed description of the regenerative heat exchanger 20, which is identical to the description given with reference to FIG. 2, will be omitted, except that the first flow passage 22 is in communication with the air outlet passage 32, and the room air is discharged to the exterior through the first flow passage 22, and the second flow passage 23 is in communication with the air inlet passage 33, and the external air is introduced into the room through the second flow passage 23.

The first heat exchanger 14 is provided in the air inlet passage 33, more specifically, between the regenerative heat exchanger 20 and the first air outlet 33*b* adjacent to the first air outlet 33*b*. The second heat exchanger 13 is provided in the air outlet passage 32, more specifically, between the regenerative heat exchanger 20 and the second air outlet 32*b* adjacent to the regenerative heat exchanger 20, for an example, fixed to the duct 31. If the second heat exchanger 13 is provided adjacent to the regenerative heat exchanger 20, a flow resistance can be reduced because the room air passes the second heat exchanger 13 directly after passing through the regenerative heat exchanger 20.

The compressor 11 is provided in the air outlet passage 32 in the case 30, more specifically, between the second heat exchanger 13 and the second air outlet 32*b*, for an example, adjacent to the second air outlet 32*b* as shown in FIG. 4. Though not shown, the flow path control valve is provided in the case 30 so as to be connected to the outlet of the compressor 11. The flow path control valve has two outlet connected to the first heat exchanger 14 and the second heat exchanger 13, respectively. The expansion device (not shown) is provided in the refrigerant pipeline connected between the first heat exchanger 14 and the second heat exchanger 13.

The first fan 17 is provided in the air inlet passage, more specifically, between the regenerative heat exchanger 20 and the first heat exchanger 14. The first fan 17 provided thus draws the external air through the second air inlet 33*a*, and discharges into the room through the first air outlet 33*b*. In this instance, the external air drawn through the second air inlet 33*a* is discharged into the room via the second flow passage 23 in the regenerative heat exchanger 20, the first fan 17, and the first heat exchanger 14. As shown in FIG. 4, the second fan 16 is provided in the air outlet passage 32, more specifically, between the regenerative heat exchanger 20 and the first air inlet 32*a*. The second fan 16 provided thus draws room air through the first air inlet 32*a* and discharges to the exterior through the second air outlet 32*b*. In this instance, the air drawn through the first air inlet 32*a* is discharged to the exterior after passing through the regenerative heat exchanger 20, the second heat exchanger 13, and the compressor 11 in succession.

Upon putting the foregoing air conditioner into operation, the refrigerant is vaporized at either the first heat exchanger 14 or the second heat exchanger 13, and absorbs heat from an environment. Dew drops form on an outside surface of the heat exchanger which absorbs heat from the environment thus, and as the dew drops become the greater gradually, a large amount of condensed water drops down from the heat exchanger. When the air conditioner cools the room, the condensed water is formed at the first heat exchanger 14, and when the air conditioner heats the room, the condensed water is formed at the second heat exchanger 13. Therefore, a structure for making an effective discharge of the condensed water formed at the first or second heat exchanger 14, or 13 to an exterior is required.

The air conditioner of the present invention provides a structure for making effective discharge of the condensed water thus formed at the heat exchanger, which will be described referring to FIGS. 4 and 5. For reference, FIG. 5 illustrates a perspective view of a condensed water drain structure in the air conditioner in FIG. 4.

Figure 5:
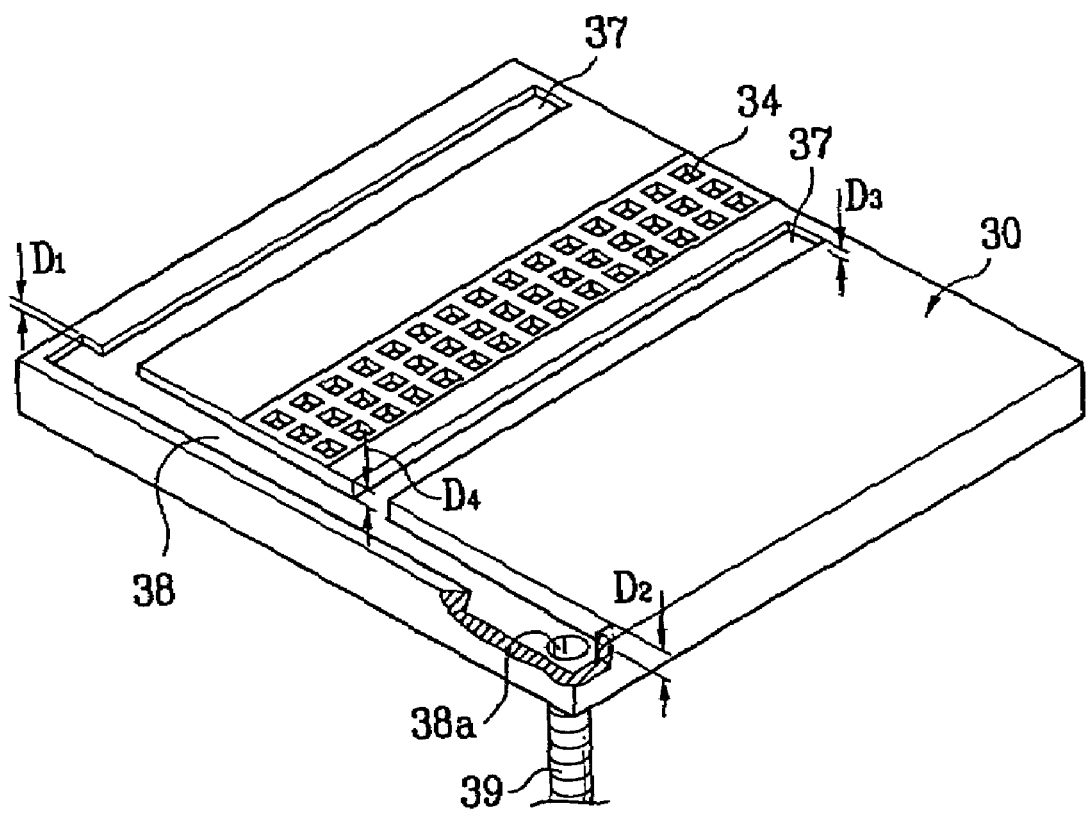
FIG. 5 illustrates a perspective view of a condensed water drain structure in the air conditioner in FIG. 4.

Referring to FIGS. 4 and 5, there are condensed water receiving grooves 37 in a bottom surface of the case 30 under lower parts of the first heat exchanger 14 and the second heat exchanger 13. As shown in FIG. 5, a drain channel 38 connects the grooves 37. FIG. 5 illustrates an example the drain channel 38 connects ends of the condensed water receiving grooves 37. However, the design of the drain channel 38 is not limited to this, but the drain channel 38 may connect both ends, or middle parts of the condensed water receiving grooves 37. A drain 38*a* is provided in the bottom of the drain channel 38. The drain 38*a* makes an inside space of the case 30 communicate with an outside space of the case 30. The drain 38*a* is provided, for an example, in the bottom surface of the case 30 adjacent to an outdoor. As shown in FIGS. 4 and 5, there is a drain hose 39 connected to an outside of the case 30. The drain hose 39 drains the condensed water from the first or second heat exchanger 14 or 13 to an exterior.

In the meantime, a structure is also suggested in the air conditioner for making effective discharge of the condensed water from the first or second heat exchanger 13. To do this, the condensed water receiving grooves 37 have a sloped bottom for easy draining of the condensed water toward the drain channel 38. Referring to FIG. 5, it can be noted that a depth D4 of a bottom of the condensed water receiving groove 37 at an end thereof connected to the drain channel 38 is deeper than a depth D3 of a bottom of the condensed water receiving groove 37 at an end D3 opposite thereto. If the condensed water receiving groove 37 is sloped thus, the condensed water dropped down from the first or second heat exchanger 14 or 13 onto the condensed water receiving grooves 37 flows to the drain channel 38, immediately.

In the meantime, a bottom of the drain channel 38 is also sloped so as to lead the condensed water toward the drain 38*a*. Referring to FIG. 5, it can be noted that a depth D2 of an end of the bottom of the drain channel 38 where the drain 38*a* is formed therein is deeper than an end D1 opposite thereto. If the bottom of the drain channel 38 is sloped thus, the condensed water from the condensed water receiving groove 37 can be lead to the drain 38*a*, easily.

According to above structure, the condensed water dropped from the first or second heat exchanger 14 or 13 onto the condensed water receiving groove 37 is discharged to an exterior quickly via the drain channel 38, the drain 38*a*, and the drain hose 39. Though not shown, a tank may be provided to an end of the drain hose 39, for temporary storage of the condensed water.

In the meantime, the air conditioner of the present invention also has a system in which the room is cooled or heated while the room air is circulated continuously without introducing the external air into the room. To do this, the case 30 is also provided with a third air inlet 34 for making the air inlet passage 33 and the room be in communication. Along with this, there is a flow path closing device provided for selective closing/opening of the third air inlet 34 and the air inlet passage 33, more specifically, the second flow path 23 of the regenerative heat exchanger 20, which will be described hereafter.

Referring to FIG. 4, the third air inlet 34 is provided between the regenerative heat exchanger 20 and the first air outlet 33b. The third air inlet 34 is directed different from the direction of the first air outlet 33b. For an example, as shown in FIG. 4, if the first air outlet 33b is provided in a vertical face of the case 30 in the room, the third air inlet 34 is provided in the bottom of the case 30 perpendicular to the vertical face. Once the third air inlet 34 is provided thus, direct introduction of the air from the third air outlet 33b to the third air inlet 34 can be prevented, effectively.

Referring to FIG. 4, there is an opening/closing panel 35 hinged on a bottom of the case 30 between the third air inlet 34 and the regenerative heat exchanger 20. The opening/closing panel 35 selectively opens/closes the third air inlet 34 and the air inlet passage 33, more specifically, the second flow passage 23 by means of a driving device in the case 30. To do this, the opening/closing panel 35 has a size which can cover the third air inlet 34 fully, and an end of the second flow passage fully. In the meantime, the driving device may be a reversible motor 36. For moving the opening/closing panel 35 by means of, for an example, the motor 36, a linkage 36a links the opening/closing panel 35 and the motor 36.

When the air conditioner only cools or heats the room without ventilating the room, the flow path closing device opens the third air inlet 34 and closes the second flow passage 23. When the air conditioner ventilates, as well as cools or heats the room at the same time, the flow path closing device closes the third air inlet 34 and opens the second flow passage 23.

In the meantime, the operation of the air conditioner of the present invention will be described, with reference to FIGS. 6A and 6B. For reference, FIG. 6A illustrates a perspective view showing an air flow when the air conditioner in FIG. 4 ventilates, as well as cools or heats a room at the same time, and FIG. 6B illustrates a perspective view showing an air flow when the air conditioner in FIG. 4 only cools or heats a room.

The air conditioner of the present invention can be operated in different modes. For an example, there are a first mode when the air conditioner ventilates as well as cools the room, a second mode when the air conditioner ventilates as well as heats the room, a third mode when the air conditioner only cools the room, a fourth mode when the air conditioner only heats the room, and a fifth mode when the air conditioner only ventilates the room. Taking examples, each of the modes will be described.

Figure 6A:
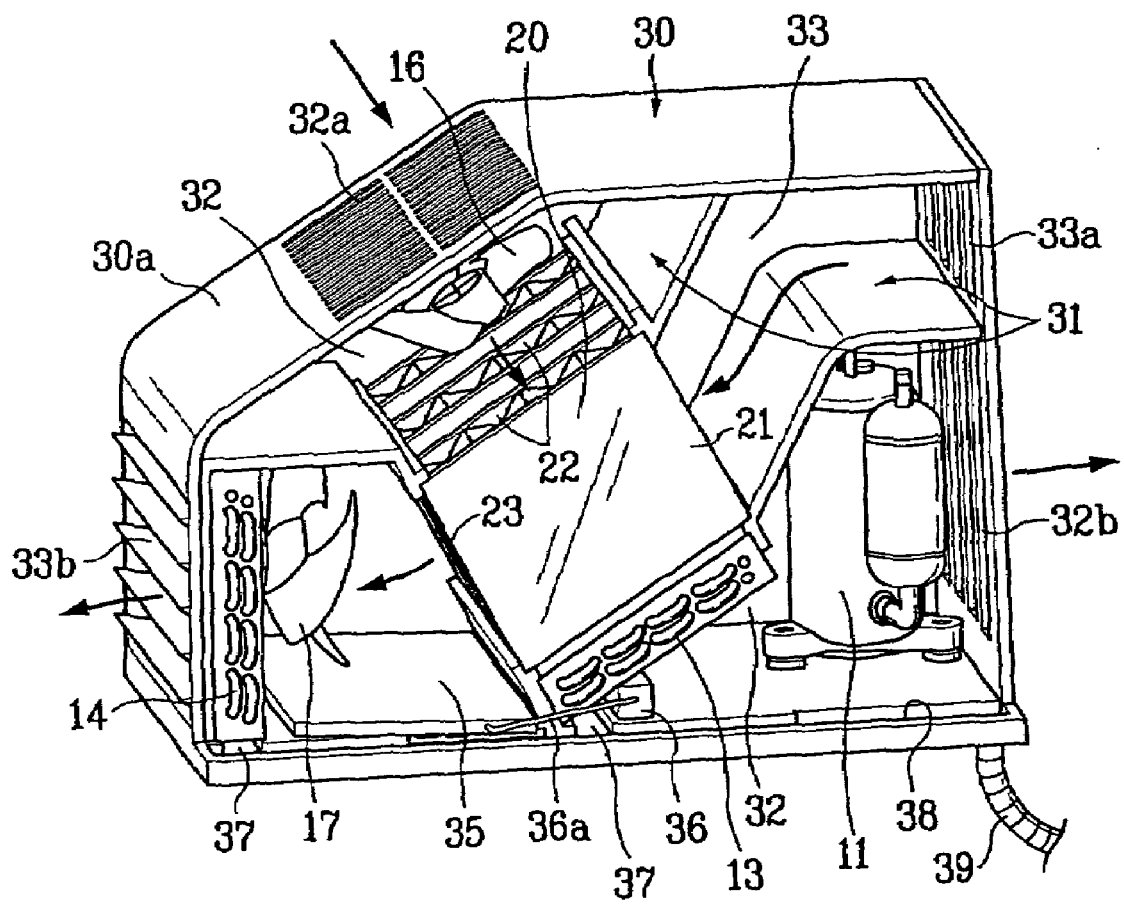
FIG. 6A illustrates a perspective view showing an air flow when the air conditioner in FIG. 4 ventilates, as well as cools or heats a room at the same time.
Figure 6B:
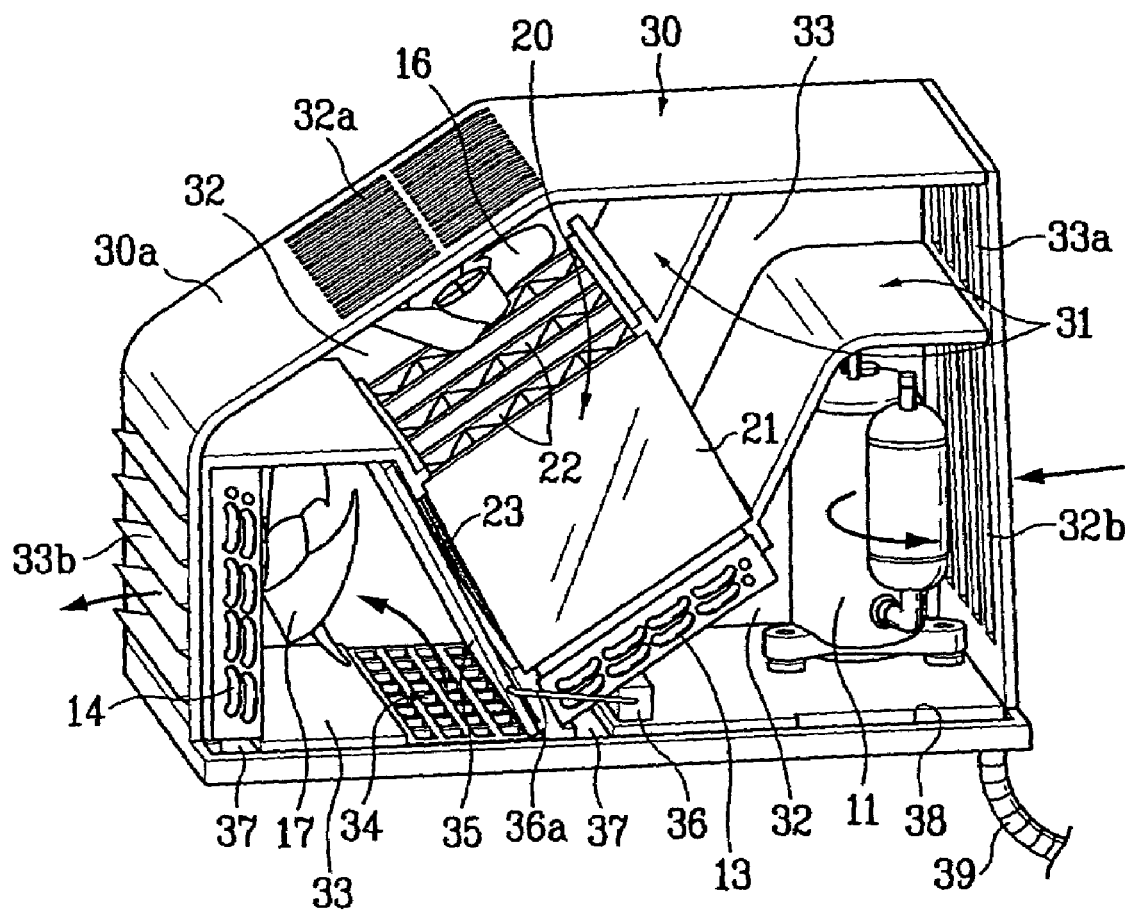
FIG. 6B illustrates a perspective view showing an air flow when the air conditioner in FIG. 4 only cools or heats a room.

In a case of the first mode when the air conditioner ventilates as well as cools the room, as shown in FIG. 6A, the opening/closing panel 35 is kept to close the third air inlet 34. The refrigerant flows from the compressor 11 to the flow path control valve, and the flow path control valve guides the refrigerant to the second heat exchanger 13. The refrigerant condensed at the second heat exchanger 13 expands at the expansion device 15, and introduced into the first heat exchanger 14 where the refrigerant absorbs heat from an environment.

At the same time with putting the compressor 11 into operation, the first, and second fans 17 and 16 are also operated. Therefore, the external air is introduced into the air inlet passage 33 through the second air inlet 33a, and is discharged into the room through the first air outlet 33b via the regenerative heat exchanger 20, the first fan 17, and the first heat exchanger 14. In this instance, since the external air is discharged into the room in a state the air heat exchanges, and cooled at the first heat exchanger 14, the room is cooled. In this instance, an angle of each of the louvers may be adjusted for adjusting a direction of the cold air discharge. In the meantime, the condensed water formed at the first heat exchanger 14 is drained to the exterior via the condensed water receiving grooves 37, the drain channel, the drain 38a, and the drain hose 39 in succession.

In the meantime, as the second fan 16 rotates, the room air is introduced into the air outlet passage 32 through the first air inlet 32a, and discharged to the exterior through the second air outlet 32b via the first flow passage 22 in the regenerative heat exchanger 20, the second heat exchanger 13, and the compressor 11. In this instance, the discharged cold air indirectly heat exchanges with the external air introduced into the room at the regenerative heat exchanger 20, a thermal energy of the room air discharged to the exterior is transferred to the external air introduced into the room. Therefore, a temperature of the external air drops as the external air passes the regenerative heat exchanger 20 lower than a time the external air is introduced through the second air inlet 33a, and drops further as the external air passes through the first heat exchanger 14. Therefore, a high thermal energy recovery effect can be obtained by means of the regenerative heat exchanger 20, and a cooling performance can be improved, accordingly.

The air conditioner of the present invention can ventilate as well as cools the room according to above process. Therefore, even if the room is cooled for a long time with the air conditioner, the room air can be kept clean, and room humidity can also be kept constant. As described, since the external air is cooled at the regenerative heat exchanger 20, and cooled at the first heat exchanger 14 once more, the thermal energy loss occurred when the room air is ventilated can be reduced, effectively. Moreover, the slopes of the condensed water receiving grooves 37 and the drain channel 38 facilitate fast draining of the condensed water formed at the first heat exchanger 14 to the exterior.

Next, a case of the second mode when the air conditioner ventilates as well as heats the room will be described. In this case too, the opening/closing panel 35 is kept to close the third air inlet 34. The refrigerant is compressed at the compressor 11, and guided to the first heat exchanger 14 by the flow path control valve. The refrigerant is condensed at the first heat exchanger 14, and the first heat exchanger 14 discharges the condensing heat to an environment. The condensing heat from the first heat exchanger 14 is transferred to the room air blown toward the room by the first fan 17. Therefore, the external air heated at the first heat exchanger 14 heats the room. The refrigerant liquefied at the first heat exchanger 14 introduced into the compressor 11 again via the first expansion device 15 and the second heat exchanger 13.

In the meantime, upon putting the compressor 11 into operation, the first and second fans 17 and 16 are also operated. Therefore, the external air is discharged into the room via the air inlet passage 33, and the room air is discharged to the exterior via the air outlet passage 32. As the room air and the external air heat exchange at the regenerative heat exchanger 20, the external air is heated by the room air, and discharged into the room in a state heated by the first heat exchanger 14. The air conditioner can ventilate as well as heat the room according to above process, when the thermal energy loss is minimum.

In the meantime, a case of the third or fourth mode when the air conditioner only cools or heats the room will be described with reference to FIG. 6B. In the third mode, as shown in FIG. 6B, the opening/closing panel is kept to close the air inlet passage 33, more specifically, the second flow passage 23. The refrigerant from the compressor 11 passes through the flow path control valve, and introduced into the compressor 11 again via the second heat exchanger 13, the expansion device 15, and the first heat exchanger 14. In this instance, the refrigerant vaporizes at the first heat exchanger 14, and absorbs heat from an environment of the first heat exchanger 14.

In the third mode, the first fan 17 starts rotation at the same time with putting the compressor 11 into operation. Then, as shown in FIG. 6B, the room air is introduced into the air inlet passage 33 through the third air inlet 34. Then, the air heat exchanges, and is cooled at the first heat exchanger 14, and discharged into the room through the first air outlet 33b. In the third mode, the second fan 16 does not rotate. According to this, the room air is not discharged to the exterior through the air outlet passage 32. Therefore, in the third mode, the room air cools the room as the room air circulates through the room in a state no room air is discharged to the exterior, or no external air is introduced into the room.

In the meantime, because no air flows through the air outlet passage 32 in the third mode, there may be a problem of overheat of the compressor 11. However, the compressor 11 in the air conditioner of the present invention is mounted adjacent to the second air outlet 32b in contact with the exterior, no overheat problem is occurred. That is, as shown in FIG. 6B, the external air is introduced into an inside of the air outlet passage 32 through the second air outlet 32b. Since the introduced air heat exchanges at the compressor 11 and discharged to the exterior again, no overheat problem of the compressor 11 is occurred.

In the fourth mode too, the opening/closing panel 35 closes the air inlet passage 33, more specifically, the second flow passage 23. Condensing heat is generated at the first heat exchanger 14, and the room air introduced into the third air inlet 34 by the first fan 17 is discharged into the room through the first air outlet 33b via the first heat exchanger 14. Because all operation of the fourth mode is identical to the third mode except only the operation of the first heat exchanger 14 caused by change of a circulation direction of the refrigerant, no more description will be given.

In the fifth mode when the room is only ventilated, the first fan 17 and the second fan 16 are rotated in a state the opening/closing panel 35 is kept to close the third air inlet 34. In this instance, the compressor is not in operation, and according to this, no heat exchange is made in the first heat exchanger 1, too. However, since there is indirect heat transfer between the external air and the room air at the regenerative heat exchanger 20, there is a little thermal energy loss reduction effect.

In cooling or heating the room with the air conditioner of the present invention, it is preferable that the first or the second mode is carried out at regular intervals for short time periods during the third or fourth mode. Then, excessive energy consumption can be prevented as the ventilation can be made only when the ventilation is necessary on all account during the cooling or heating in a state the thermal energy loss is minimized.

In the meantime, the air conditioner is mounted in a state the refrigerant pipelines connected to the compressor 11 and the first and second heat exchangers 14 and 13, and different wirings are entangled with different components very complicatedly. Therefore, for repair or cleaning the first and second fans 17 and 16, the regenerative heat exchanger 20, and the like, there is a drawback in that the regenerative heat exchanger 20 and the first and second fans 17 and 16 can be taken out after the compressor 11, the first and second heat exchangers 14 and 13, and the pipelines are taken out of the case 30. Therefore, repair of the components is very difficult. Moreover, it is liable that the air conditioner is operated for a long time in a state a hygienic condition of the air conditioner is poor, because taking out of the first and second fans 17 and 16 which require cleaning periodically and the regenerative heat exchanger 20 is not easy. Furthermore, such a structure requires complicate and difficult assembly process in fabrication of the product, the structure drops productivity.

Figure 7:
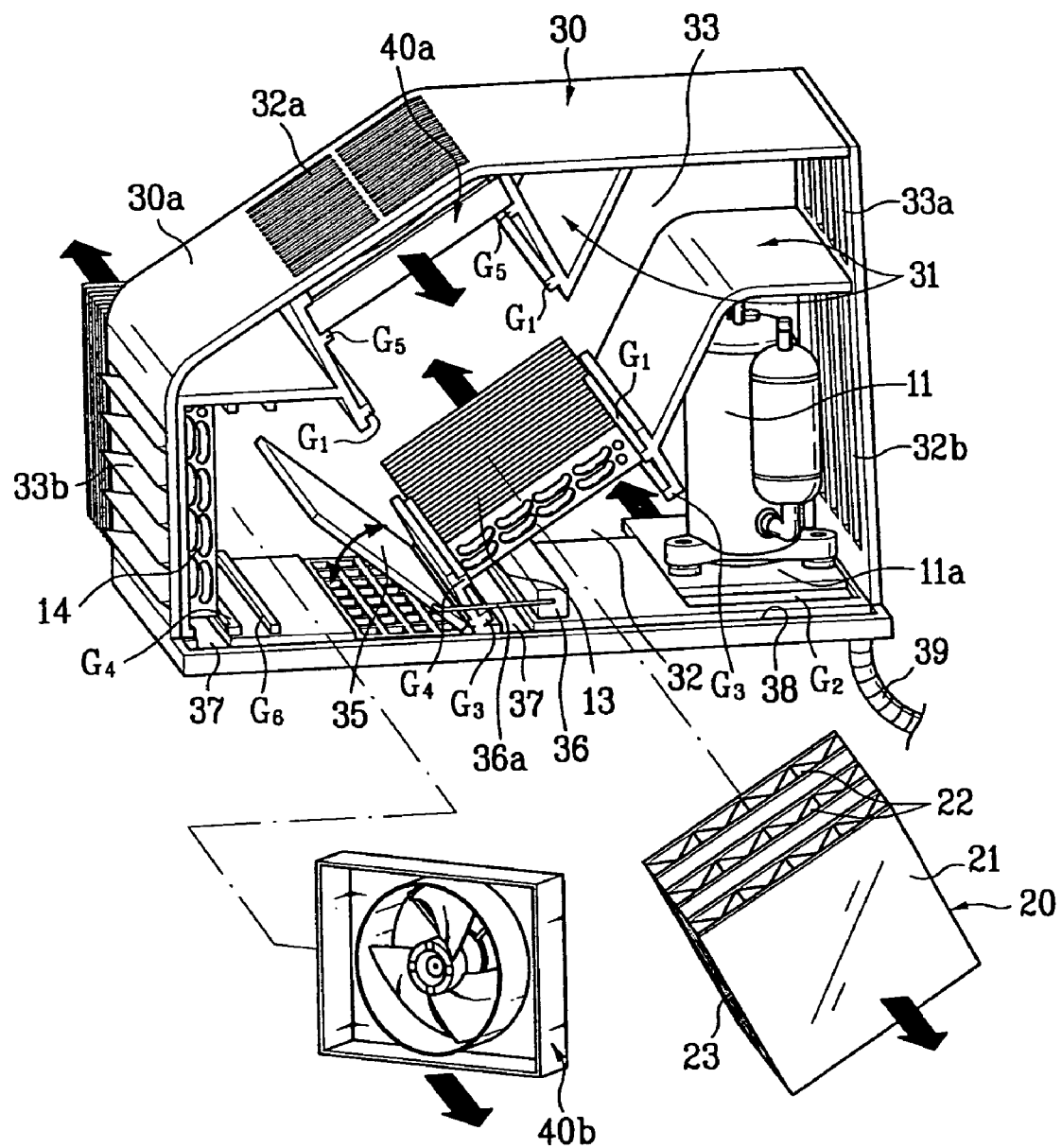
FIG. 7 illustrates a disassembled perspective view of an inside of an air conditioner having an improved assembly structure in accordance with a preferred embodiment of the present invention.
Figure 8:
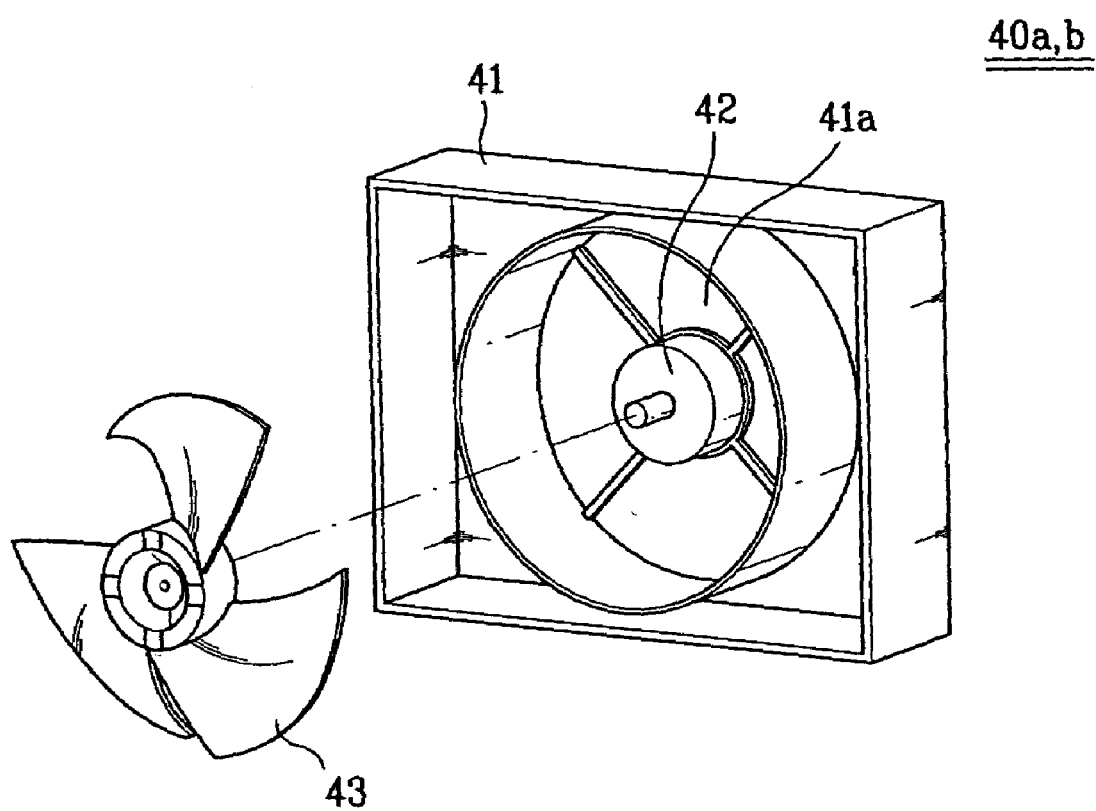
FIG. 8 illustrates a disassembled perspective view of the fan assembly in FIG. 7.

The air conditioner of the present invention suggest a structure for easy mounting/dismounting of components onto/from the case 30 for solving the foregoing problems, which will be described with reference to FIGS. 7 and 8. FIG. 7 illustrates a disassembled perspective view of an inside of an air conditioner having an improved assembly structure in accordance with a preferred embodiment of the present invention, and FIG. 8 illustrates a disassembled perspective view of the fan assembly in FIG. 7.

In the air conditioner of the present invention, the compressor 11, the first and second heat exchangers 14 and 13, the first and second fans 40b and 40a, and the regenerative heat exchanger 20 are slid into the case 30 from a side of the case 30 and fastened, or vice versa. According to this, the refrigerant pipelines connected between the compressor 11 and the first and second heat exchangers 14 and 13 and various wirings related to the components are arranged adjacent to a first side. In the meantime, for easy mounting/dismounting of the first and second fans 40b and 40a, and the regenerative heat exchanger 20 even in a state the compressor 11 and the first and second heat exchangers 14 and 13 are mounted/dismounted, the first and second fans 40b and 40a, and the regenerative heat exchanger 20 mounted/dismounted through a second side opposite to the first side of the case 30. To do this, the air conditioner is provided with a plurality of sliding guides for sliding in/out of the components through relevant sides of the case 30. The sliding guides will be described. Since the first and second fans 40b and 40a have structures slightly different from the first and second fans 17 and 16, different reference symbols will be given.

The air conditioner is provided with first sliding guides G1 for the regenerative heat exchanger 20. The first sliding guides G1 is provided to the duct 31. In more detail, as shown in FIG. 7, the first sliding guides G1 are provided at four corners of a part in which the air inlet passage 33 and the air outlet passage 32 cross each other. The first sliding guides G1 provided thus fit to, and engage with the four corners of the regenerative heat exchanger 20 respectively when the regenerative heat exchanger 20 is mounted/dismounted through the second side of the case 20. When the regenerative heat exchanger 20 is mounted fully, the first sliding guides G1 support the four corners of the regenerative heat exchanger 20, to keep a mounted state of the regenerative heat exchanger 20. In the meantime, the first sliding guide G1 may be provided with a first stopper (not shown) for limiting a depth of insertion of the regenerative heat exchanger 20 and fixing a mounting position. It is preferable that the first stopper is mounted adjacent to the first side opposite to the second side the regenerative heat exchanger 20 inserted therethrough. The first stopper provided thus also prevents the regenerative heat exchanger 20 from being inserted through the first side, wrongly.

Referring to FIG. 7, there is a second sliding guide G2 provided for the compressor 11. The second sliding guide G2 is a large recess in a bottom part of the case 30 where the air outlet passage 32 is. There is a base plate 11a provided for slidably inserting into the second sliding guide G2, on which the compressor 11 is mounted. The second sliding guide G2 has an opened first side and closed second side. Therefore, when the compressor 11 is inserted into the case 30, the base plate 11a with the compressor 11 mounted thereon is inserted into the second sliding guide G2, and pushed toward the second side. In the meantime, since it is preferable that the compressor 11 is provided adjacent to the second air outlet 32b, the second sliding guide G2 is also provided adjacent to the second air outlet 32b in a bottom part of the case 30 where the air outlet passage 32 is.

Referring to FIG. 7, there are fourth and third sliding guides G4 and G3 for the first and second heat exchangers 14 and 13. The third sliding guides G3 for the second heat exchanger 13 is provided in the air outlet passage 32, more specifically, between the regenerative heat exchanger 20 and the second air outlet 32b. As described before, since the second heat exchanger 13 is adjacent to the regenerative heat exchanger 20, the third sliding guides are formed on the duct 31 parallel to the first sliding guides G1 as shown in FIG. 7. In this instance, as shown in FIG. 7, some of the third sliding guides G3 that guide upper corners of the second heat exchanger 13 may be formed as one unit with some of the first sliding guides G1 that guide lower corners of the regenerative heat exchanger 20, respectively. In the meantime, for mounting/dismounting the second heat exchanger 13 through a first side of the case 30, and for easy positioning of the mounting, a second stopper (not shown) is provided to the third sliding guide G3. The second stopper is provided to a part adjacent to the second side of the case 30.

The fourth sliding guides G4 for the first heat exchanger 14 are provided in the air inlet passage 33, more specifically, between the regenerative heat exchanger 20 and the first air outlet 33b. As described before, since the first heat exchanger 14 is provided adjacent to the first air outlet 33b, the fourth sliding guide G4 are also provided on the bottom of the case 30 adjacent to the first air outlet 33b as shown in FIG. 7. In the meantime, for mounting/dismounting the first heat exchanger 14 through the first side, and for easy positioning of the first heat exchanger 14, the fourth sliding guide G4 is provided with a third stopper (not shown). The third stopper is provided adjacent to the second side.

In the meantime, there is the condensed water receiving grooves 37 in a part of the bottom of the case 30 between the third and fourth sliding guides G3 and G4, for receiving the condensed water formed at the second and first heat exchangers 13 and 14. The drain channel 38 is formed to connect the condensed water receiving grooves 37. Since the condensed water receiving grooves 37, the drain channel 38, and the drain and drain hose 39 provided therewith are described already, no more description will be provided.

Referring to FIG. 7, there are sixth and fifth sliding guides G6 and G5 for the first and the second fans 40b and 40a. The fifth sliding guides G5 for the second fan 40a is provided in the air outlet passage 32, more specifically, between the regenerative heat exchanger 20 and the first air inlet 32a. As shown in FIG. 7, the first sliding guides are provided to the duct 31 adjacent to the first air inlet 32a. However, the fifth sliding guides G5 are not limited to this, but a variation is also available, in which the fifth sliding guides have a form of extension from the case 30. The sliding guides G5 is used mounting/dismounting the second fan 40a through the second side of the case 30. The fifth sliding guide G5 is provided with a fourth stopper (not shown) for serving similar to the first to third stoppers. The fourth stopper is provided adjacent to the first side.

The sixth sliding guides G6 for the first fan 40b is provided in the air inlet passage 33, more specifically, between the regenerative heat exchanger 20 and the first air outlet 33b. As described before, since the first heat exchanger 14 is provided adjacent to the first air outlet 33b, the sixth sliding guides G6 are provided between the regenerative heat exchanger 20 and the first heat exchanger 14. Of the sliding guides G6 provided on the bottom of the case 30, ones adjacent to the fourth sliding guide G4 may be formed as one unit with the fourth sliding guide G4 as shown in FIG. 7. In the meantime, the sixth sliding guides G6 are provided with a fifth stopper serving similar to the first to fourth stoppers, provided at the second side.

In the meantime, the first and second fans 40b and 40a, mounted/dismounted between the sixth and fifth sliding guides G6 and G5 through the second side, are fabricated as assemblies as shown in FIG. 8 respectively for easy mounting/dismounting. As shown in FIG. 8, the first or second fan 40b or 40a assembly includes a body 41, a motor 42, and a blade assembly 43. The body 41 has an orifice 41a at a center for air pass. An outside of the body 41 has a shape which can make a close contact with the fifth or sixth sliding guides G5 or G6 when the body 41 is inserted between the fifth or sixth sliding guides G5 or G6. Therefore, the body 41 has at least two horizontal flat outside surfaces. As shown in FIG. 8, the motor 42 is mounted such that a rotation shaft of the motor 42 is at a center of the orifice 41 a. The blade assembly 43 is connected to the rotation shaft of the motor 41 a. Thus, once the first or second fan 40b or 40a is fabricated as one assembly including the body 41 to be inserted between the sixth or fifth sliding guides G6 or G5, the first or second fan 40b or 40a can be mounted/dismounted with easy.

A process for disassembling the air conditioner of the present invention having the structures described with reference to FIGS. 7 and 8 will be described. At first, a first side of the case 30 is opened. Then, refrigerant pipes are separated from the compressor 11, and the first and second heat exchangers 14 and 13. The compressor 11, and the first and second heat exchangers 14 and 13 are drawn out through the first side. In this instance, the second, sixth, and fifth sliding guides G2, G6, and G5 guide sliding. Then, the second side opposite to the first side is opened. The regenerative heat exchanger 20 is drawn out through the second side. The sliding of the regenerative heat exchanger 20 is guided by the first sliding guides G1. The first and second fans 40b and 40a are drawn out through the second side. The sliding of the first and second fans 40b and 40a are guided by the sixth and fifth sliding guides G6 and G5, respectively.

Thus, in the air conditioner of the present invention, the compressor 11 and the first and second heat exchangers 14 and 13 are dismounted through the first side, and the regenerative heat exchanger 20 is dismounted through the second side. In this instance, since the components dismounted through the first side and the component dismounted through the second side are not entangled with each other, the dismounting works are independent and easy. The components to be dismounted through the second side may be dismounted at first. In the meantime, when the components are mounted in the case 30, a reverse process of the foregoing process is taken.

As described, the air conditioner of the present invention having structures described with reference to FIGS. 7 and 8 can dismount the regenerative heat exchanger 20, and the first and second fans 40b and 40a in a state the compressor 11 and the first and second heat exchangers 14 and 13 are not dismounted. Therefore, assembly is very easy in fabrication of the product, which improves productivity. Moreover, maintenance of the air conditioner of the present invention is easy as the air conditioner can be disassembled very easily, which permits easy exchange of components when the air conditioner is out of order. Furthermore, the easy dismounting and cleaning of components that require periodic cleaning permits clean, and long time use of the air conditioner. In the meantime, as the components can be mounted at exact positions, air flow resistance inside of the case 30 can be reduced.

In the meantime, fins of the first and second heat exchangers 14 and 13 are vulnerable to damage during the first and second heat exchangers 14 and 13 are slid into/out of the case 30 during mounting/dismounting of the first and second heat exchangers 14 and 13. Therefore, the mounting/dismounting of the first and second heat exchangers 14 and 13 is difficult because the first and second heat exchangers 14 and 13 are handled with much care. There are gaps between corners of the first and second heat exchangers 14 and 13 and inside surfaces of the duct 31. Consequently, flow of the external air or room air through the gaps forms areas where no heat exchange can be made, that drops heat exchange efficiency.

The present invention suggests providing jigs 50 for protecting corners of the first and second heat exchangers 14 and 13, and closing the gaps between an inside of the duct 31 and the fin.

Figure 9:
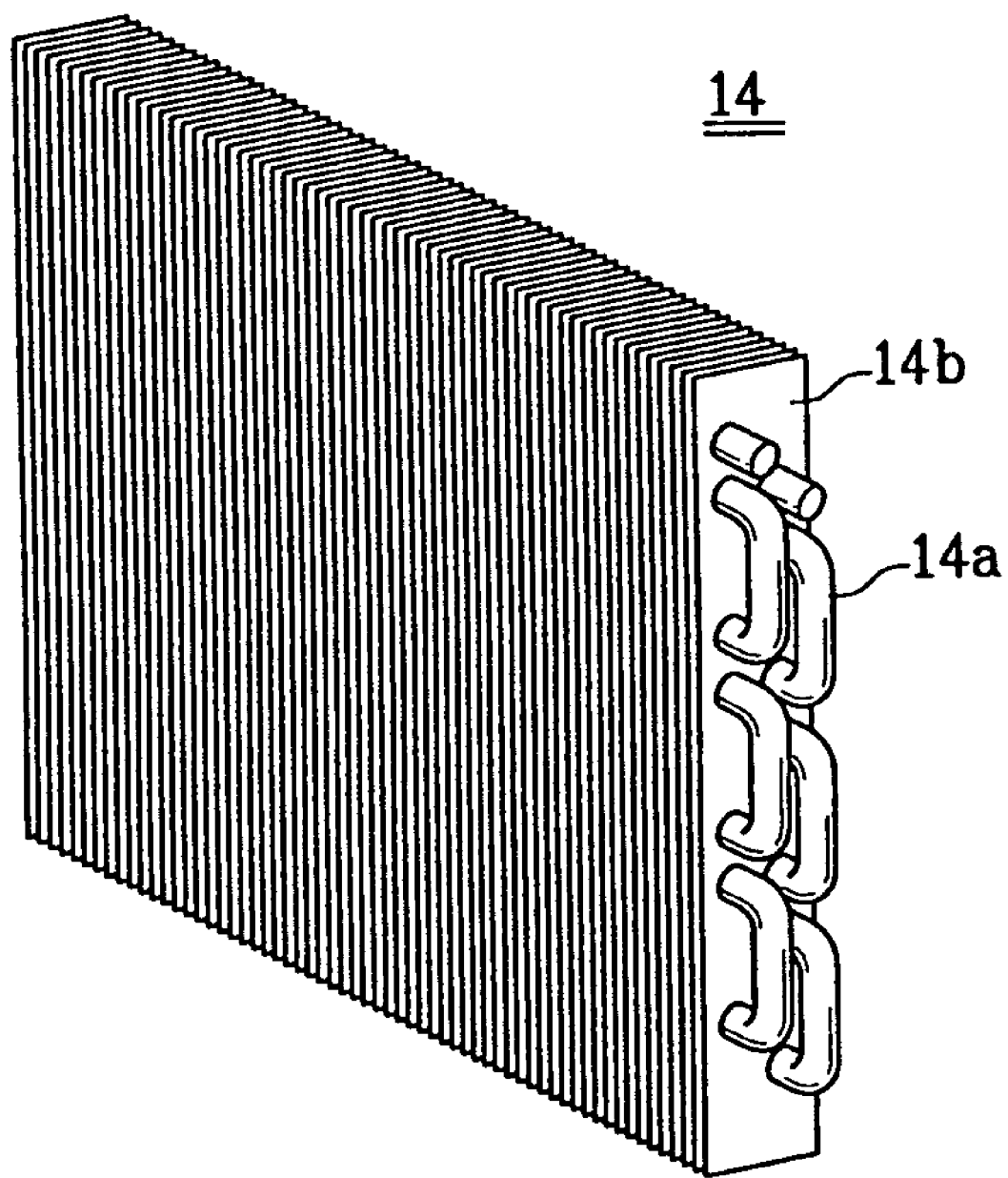
FIG. 9 illustrates a perspective view of a heat exchanger in the air conditioner in FIG. 4.
Figure 10:
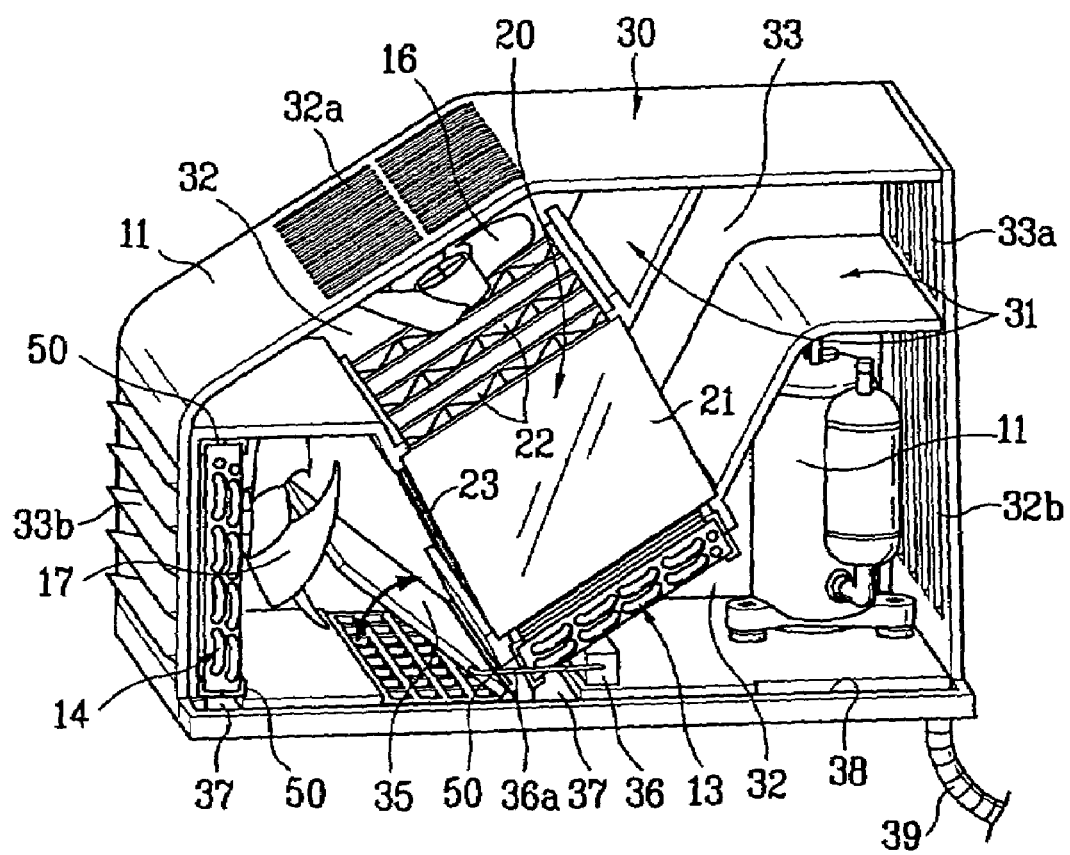
FIG. 10 illustrates a perspective view showing an inside of an air conditioner in accordance with one preferred embodiment of the present invention, having an improved heat exchanger of the present invention.
Figure 11:
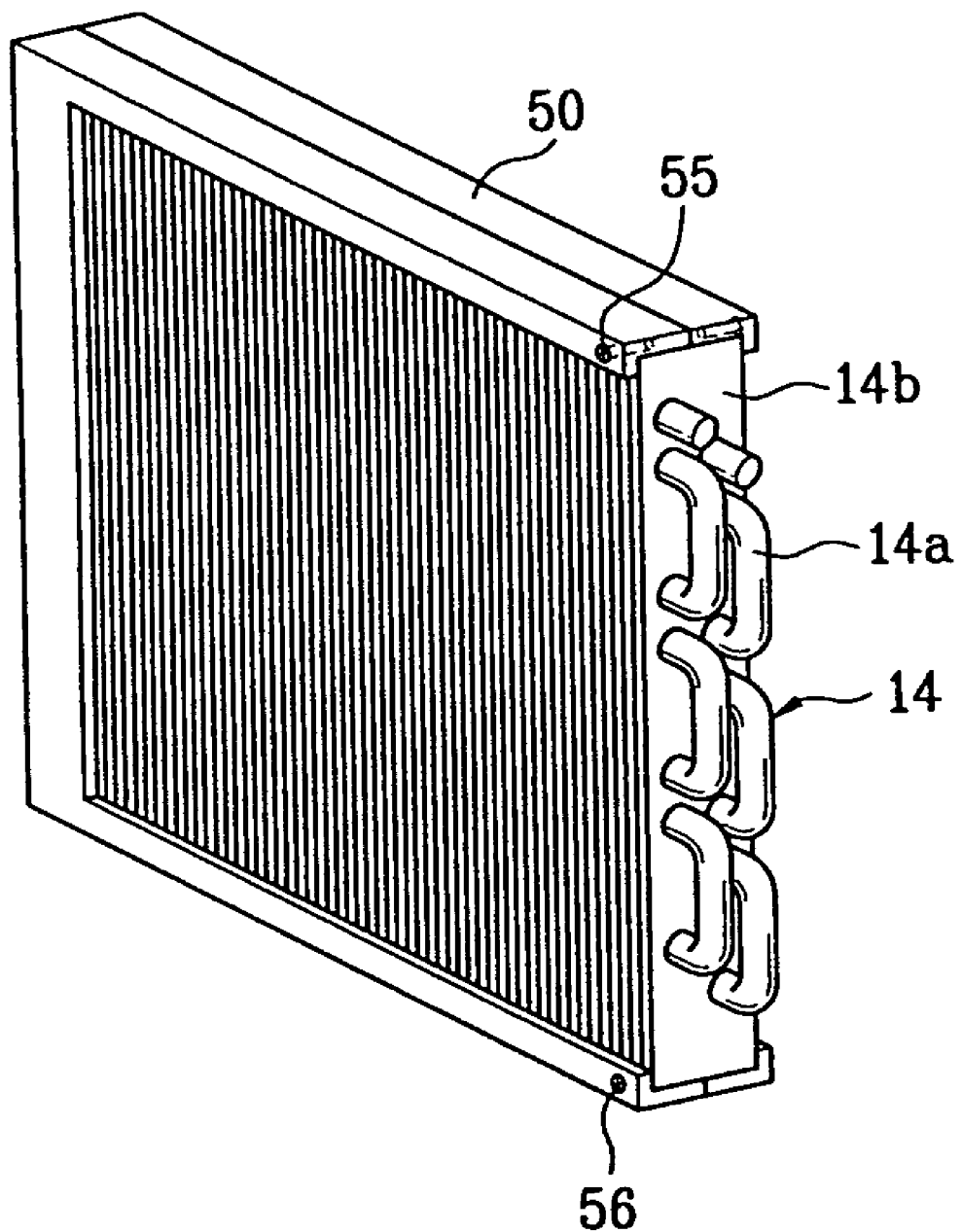
FIG. 11 illustrates a perspective view of the heat exchanger in the air conditioner in FIG. 10.
Figure 12:
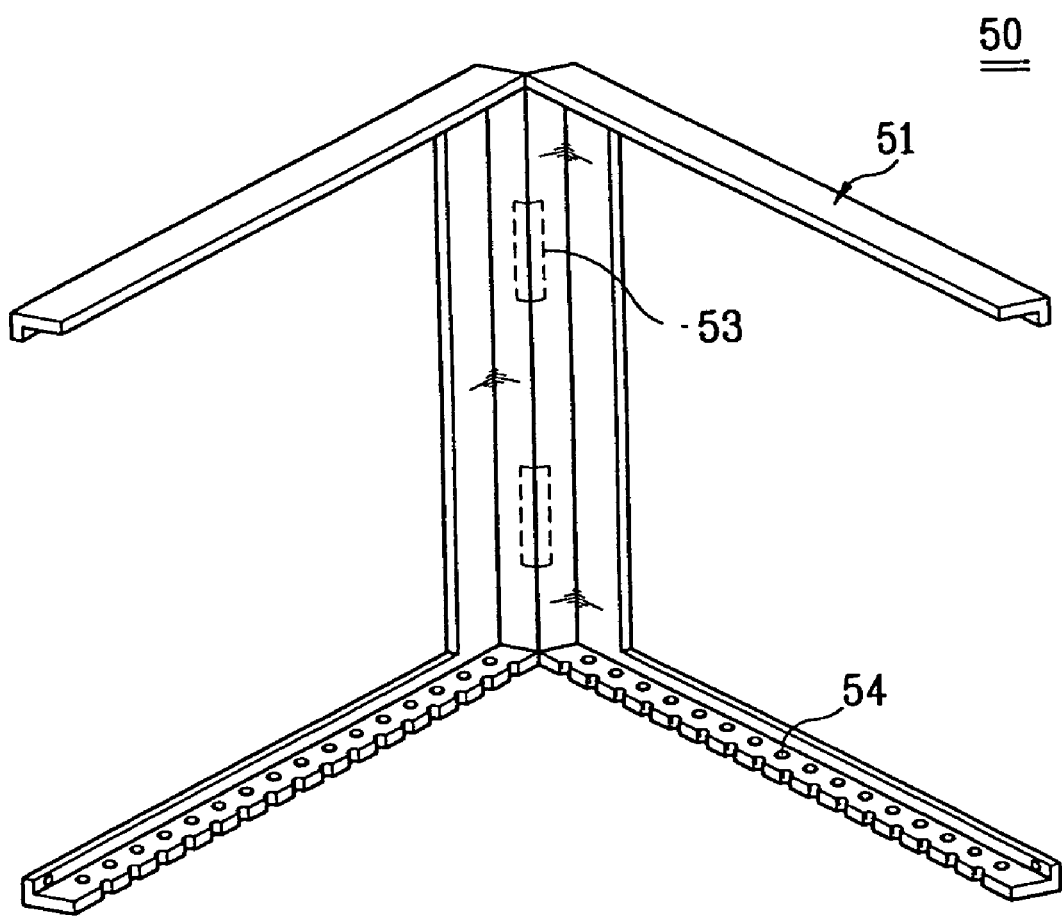
FIG. 12 illustrates a perspective view showing the jig in the heat exchanger in FIG. 11.

FIG. 9 illustrates a perspective view of a heat exchanger in the air conditioner in FIG. 4, FIG. 10 illustrates a perspective view showing an inside of an air conditioner in accordance with one preferred embodiment of the present invention, having an improved heat exchanger of the present invention, FIG. 11 illustrates a perspective view of the heat exchanger in the air conditioner in FIG. 10, FIG. 12 illustrates a perspective view showing the jig in the heat exchanger in FIG. 11. Referring to FIG. 9, the first heat exchanger 14 in FIG. 14 has a structure in which a plurality of parallel fins 14b are fitted at regular intervals on refrigerant pipes 14a. The structure is liable to damage corners or the first heat exchanger 14, i.e., edges and corners of the fins 14b when the first heat exchanger 14 is mounted/dismounted. Therefore, as shown in FIGS. 10 and 11, the jig 50 is provided for covering an outside circumference of the fins 14b.

Referring to FIG. 11, the jig 50 has a form of frame with one opened side, to cover the other three sides except the one opened side. As shown in FIG. 12, the jig 50 includes one pair of jig bodies 51 and hinges 53 for coupling the jig bodies 51. The jig bodies 51 are designed to cover an outside circumference of the fins 14b from both sides of the first heat exchanger. As the jig bodies 51 are coupled with the hinges 53, one of the jig bodies 51 can be turned around the hinge 53 with respect to the other. In the meantime, the hinge 53 is fitted to a side opposite to the one opened side. However, the hinge 53 may be fitted to other side. As shown in FIG. 11, the jig 50 is fastened to the first heat exchanger 14 with fastening members 56, firmly. The fastening members 56 are provided to the jig bodies 51 adjacent to the one opened side.

In the meantime, there are dew drops formed on an outside surface of the first heat exchanger 14 which cools the room air. The dew drops become bigger, and drop down. Therefore, the jig 50 of the present invention has drain holes 54 for draining down the condensed water formed at surfaces of the first heat exchanger 14. The drain holes 54, formed in a bottom of one or both of the jig bodies 51. The condensed water receiving groove is provided in the bottom of the case 30 for receiving the condensed water dropping down from the drain holes 54. Since descriptions of the condensed water receiving grooves 37 and the drain channel 38 are given already, no more description will be given.

Figure 13:
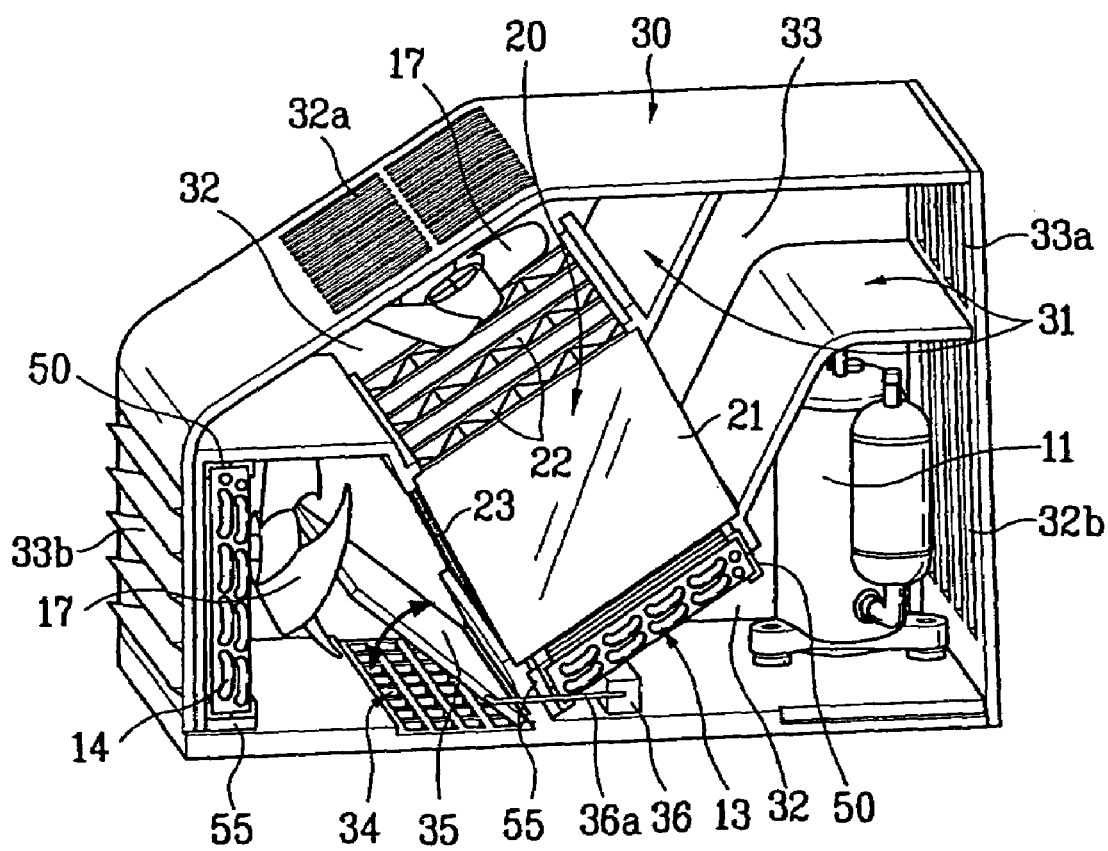
FIG. 13 illustrates a perspective view showing an inside of an air conditioner in accordance with another preferred embodiment of the present invention, having an improved heat exchanger of the present invention.
Figure 14:
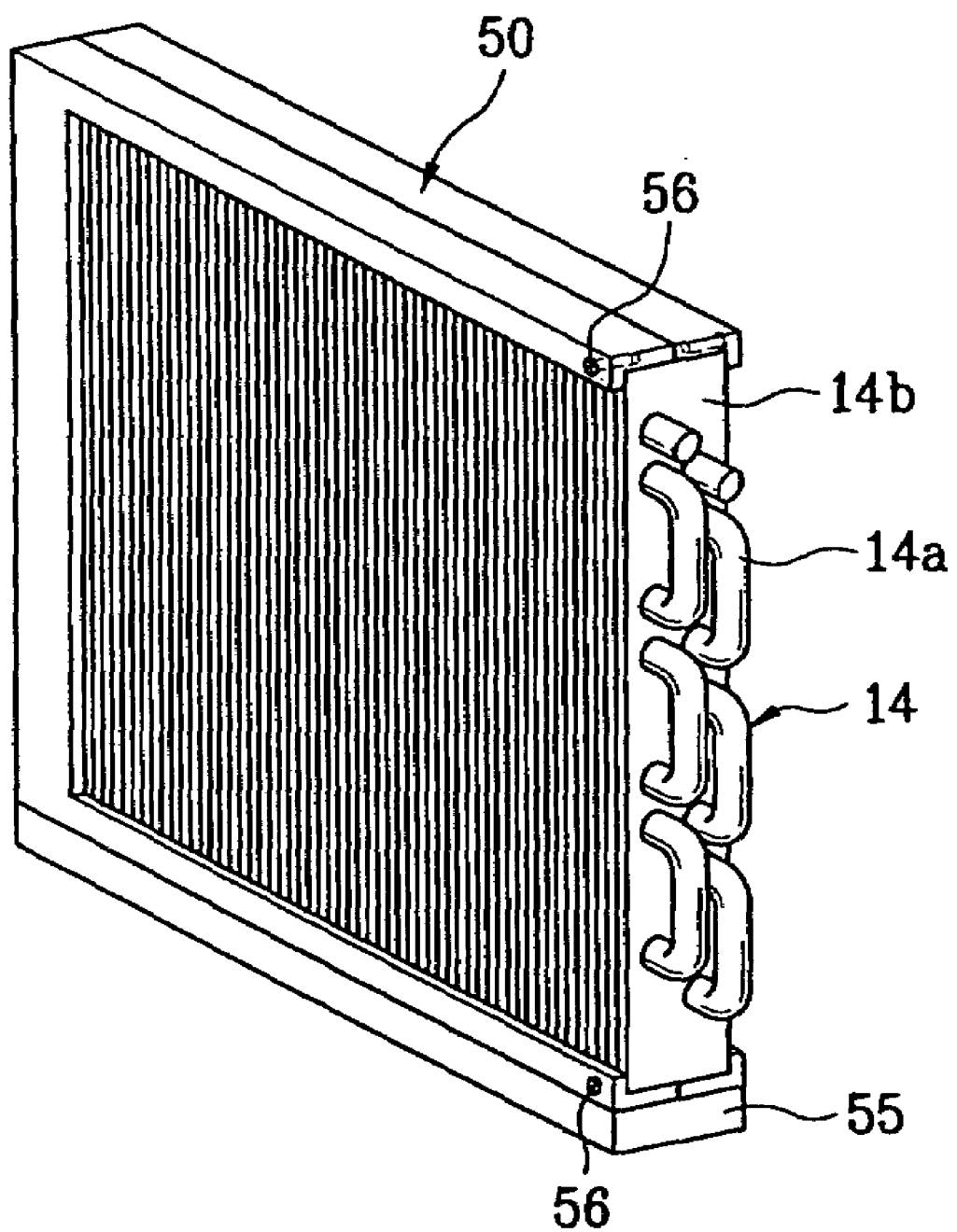
FIG. 14 illustrates a perspective view of the heat exchanger in the air conditioner in FIG. 13.
Figure 15:
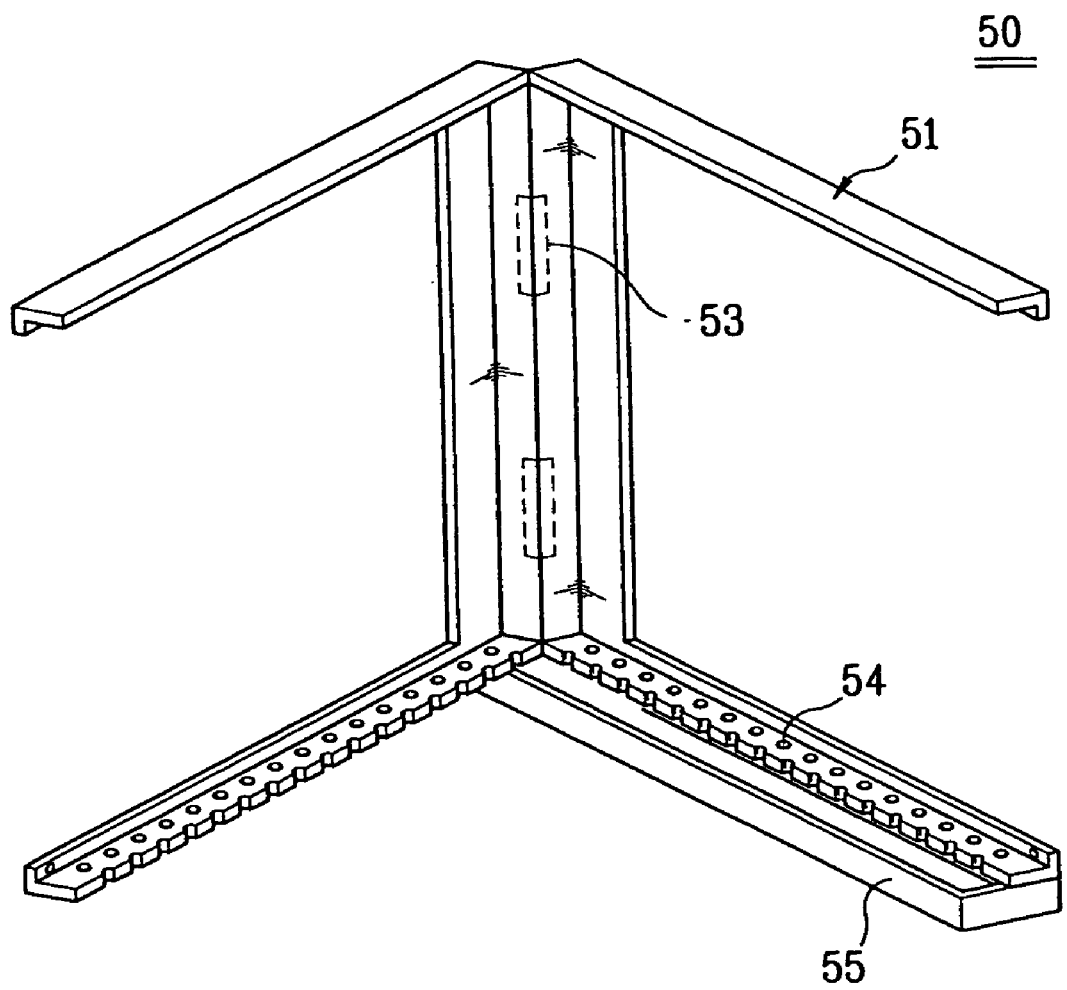
FIG. 15 illustrates a perspective view of the jig in the heat exchanger in FIG. 14.

The air conditioner of the present invention may also include a condensed water container 55, which will be described with reference to FIGS. 13~15. For reference, FIG. 13 illustrates a perspective view showing an inside of an air conditioner in accordance with another preferred embodiment of the present invention, having an improved heat exchanger of the present invention, FIG. 14 illustrates a perspective view of the heat exchanger in the air conditioner in FIG. 13, and FIG. 15 illustrates a perspective view of the jig in the heat exchanger in FIG. 14. Referring to FIGS. 13~15, the condensed water container 55 is provided under the jig bodies 51. Since the condensed water container 55 has an opened top, the condensed water container 55 can store the condensed water falling down through the drain holes 54 in the jig body 51 therein. The condensed water container 55 may be fixed to one of the jig bodies 51 partly, or formed as one unit with one of the jig bodies 51. Once the condensed water container 55 is provided to the jig 50 thus, no additional condensed water receiving groove is required in the bottom of the case 30. In the meantime, the condensed water stored in the condensed water container 55 may be drained to outside of the air conditioner with separate drain hose.

The jig is mounted on the first heat exchanger 14 by opening the two jig bodies 51 a little around the hinge 53, and putting the first heat exchanger 14 into an inside of the opened jig bodies 51, bringing the jig bodies 51 into close contact with the circumference of the first heat exchanger 14, and fastening the jig bodies 51 and the first heat exchanger 14 with the fastening members 56. It is preferable that the jig 50 has a size which enables an outside surface of the jig 50 comes into contact with the inside surface of the duct 31 when the first heat exchanger 14 is mounted. This size of the jig 50 permits the first heat exchanger 14 to heat exchange with all air flowing through the duct 31. Moreover, sides and upper parts are held at the inside surface of the duct 31, shaking of the first heat exchanger 14 by an external impact or internal vibration can be prevented. Consequently, the problems of weakened connection parts of the refrigerant pipes and the wirings, and the like can be prevented, effectively. Once the jig 50 is mounted on the first heat exchanger 14, the damage to the corners can be prevented effectively caused when the first heat exchanger 14 is mounted/dismounted on/from the case 30. In the meantime, though the jig 50 for the first heat exchanger 14 is described, the jig 50 may be mounted on the second heat exchanger 13 in an identical manner.

The advantages of the air conditioner of the present invention can be summarized as follows. First, as room air can be ventilated while the room is cooled or heated as necessary, the room air can be prevented from being contaminated or dried even if the air conditioner is operated for a long time. Second, the recovery of a part of thermal energy from the room air by means of the regenerative heat exchanger can reduced wastes of energy taken place in the ventilation. Third, the fast discharge of the condensed water from the first and second heat exchangers prevents the condensed water from accumulating in the air conditioner. Fourth, the slide mounting/dismounting of almost all components through sides of the case makes repair and exchange of components very convenient. Fifth, as other components can be dismounted while the compressor and related components are left intact, components that require periodic cleaning can be cleaned with easy. According to this, the air conditioner can be operated in a clean state for a long time. Sixth, the protection of edges of the heat exchangers with the jigs can prevent damage to the fins. Seventh, the close contact of the jigs to inside surfaces of the case and duct permits the heat exchangers to heat exchange with all air flowing through the duct. Therefore, heat exchange efficiency can be improved. Moreover, shaking of the heat exchangers by impact or vibration can be prevented, thereby preventing the air conditioner becoming into out of order. Though the advantages of the present invention is described, advantages and effects of the present invention that are not described is inclusive.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An air conditioner comprising:
    a case having an air inlet passage therein for directing external air into a room, an air outlet passage therein, intersecting the air inlet passage, for directing a room air to an exterior;
    a regenerative heat exchanger at a intersecting point of the air inlet and outlet passages for making indirect heat exchange of the external air and room air flowing through the air inlet and outlet passages, respectively;
    first and second heat exchangers provided on the air inlet and outlet passages, respectively, for exchanging heat with an air passing through the air inlet and outlet passages, respectively;
    a first air inlet making the air outlet passage and the room be in communication;
    a second air inlet making the air inlet passage and the exterior be in communication;
    a first air outlet making the air inlet passage and the room be in communication;
    a second air outlet making the air outlet passage and the exterior be in communication;
    a third air inlet making the air inlet passage and the room be in communication; and
    a flow passage opening and closing device in the case for selective opening and closing of the third air inlet and the air inlet passage.

2. The air conditioner as claimed in claim 1, wherein the third air inlet is provided between the regenerative heat exchanger and the first air outlet.

3. The air conditioner as claimed in claim 1, wherein the third air inlet is provided on the bottom of the case.

4. The air conditioner as claimed in claim 1, wherein the second air inlet and the second air outlet are provided on one surface of the case, and the first air inlet and outlet and the third air inlet are provided on the other surfaces each facing different directions from each other and from the surface on which the second air inlet and outlet are provided.

5. The air conditioner as claimed in claim 1, wherein the flow passage opening and closing device includes:
    an opening and closing panel hinge coupled to a bottom of the case between the regenerative heat exchanger and the third air inlet,
    a driving device mounted in the case, and
    a linkage connected between the driving device and the opening and closing panel for selective opening and closing of the third air inlet and the air inlet passage with the opening and closing panel following operation of the driving device.

6. The air conditioner as claimed in claim 5, wherein the driving device comprises a reversible motor.

7. The air conditioner as claimed in claim 1, wherein the case further includes:
    condensed water receiving grooves in parts of a bottom thereof under lower parts of the first and second heat exchangers respectively,
    a drain channel connected to the condensed water receiving grooves, and
    a drain provided in the bottom of the drain channel.

8. The air conditioner as claimed in claim 7, wherein the condensed water receiving grooves have sloped bottoms for leading the condensed water toward the drain channel.

9. The air conditioner as claimed in claim 7, wherein the drain channel connects one or opposite ends of each of the condensed water receiving grooves.

10. The air conditioner as claimed in claim 7, wherein the drain channel has a sloped bottom for leading the condensed water toward the drain.

11. The air conditioner as claimed in claim 10, wherein the drain is provided to a side adjacent to an outdoor.

12. The air conditioner as claimed in claim 1, wherein the device is configured to selectively open the third air inlet while closing the air inlet passage to direct air in the room to the first air outlet through the third air inlet, and to selectively close the third air inlet while opening the air inlet passage to direct air at the exterior to the first air outlet through the air inlet passage.

13. An air conditioner comprising:
    a case having an air inlet passage for directing external air into a room, an air outlet passage for directing a room air to an exterior, and a plurality of air holes each provided at each end of the air inlet and outlet passages;
    heat exchangers provided on the air inlet and outlet passages, respectively;
    a supplementary air inlet provided on the case for making the air inlet passage and the room be in communication; and
    a flow passage opening and closing device in the case for selective opening and closing of the supplementary air inlet and the air inlet passage.

14. The air conditioner as claimed in claim 13, wherein the supplementary air inlet is provided on the bottom of the case, the bottom facing different direction from the other surfaces on which the plurality of air holes are each provided.

15. The air conditioner as claimed in claim 13, wherein the flow passage opening and closing device includes:
    opening and closing panel hinge coupled to a bottom of the case,
    a driving device mounted in the case, and
    a linkage connected between the driving device and the opening and closing panel for selective opening and closing of the supplementary air inlet and the air inlet passage with the opening and closing panel following operation of the driving device.

16. The air conditioner as claimed in claim 13, wherein the case further includes:
    condensed water receiving grooves in parts of a bottom thereof under lower parts of the heat exchangers respectively,
    a drain channel connected to the condensed water receiving grooves, and
    a drain provided in the bottom of the drain channel, wherein the grooves have sloped bottoms for leading the condensed water toward the drain channel and the drain channel has a sloped bottom for leading the condensed water toward the drain.

17. The air conditioner as claimed in claim 13, wherein the device is configured to selectively open the supplementary air inlet while closing the air inlet passage to direct air in the room to the room again after passing through the supplementary air inlet and the heat exchanger in the air inlet passage, and to selectively close the supplementary air inlet while opening the air inlet passage to direct air at the exterior to the room through the air inlet passage.

18. An air conditioner comprising:
- a case having an air inlet passage for directing external air into a room, an air outlet passage, intersecting the air inlet passage, for directing a room air to an exterior, and a plurality of air holes each provided at each end of the air inlet and outlet passages;
- a regenerative heat exchanger at an intersecting point of the air inlet and outlet passages for making heat exchange of the external air and the room air;
- heat exchangers provided on the air inlet and outlet passages, respectively;
- a supplementary air inlet provided on the case for making the air inlet passage and the room be in communication;
- condensed water receiving grooves in parts of a bottom of the case under lower parts of each heat exchanger, respectively;
- a drain channel provided on the bottom and connected to the condensed water receiving grooves;
- a drain provided on the bottom of the drain channel; and
- a flow passape opening and closing device in the case for selective opening and closing of the supplementary air inlet and the air inlet passage.

19. The air conditioner as claimed in claim 18, wherein the grooves have sloped bottoms for leading the condensed water toward the drain channel and the drain channel has a sloped bottom for leading the condensed water toward the drain.

20. The air conditioner as claimed in claim 18, wherein the device is configured to selectively open the supplementary air inlet while closing the air inlet passage to direct air in the room to the room again after passing through the supplementary air inlet and the heat exchanger in the air inlet passage, and to selectively close the supplementary air inlet while opening the air inlet passage to direct air at the exterior to the room through the air inlet passage.

* * * * *